United States Patent
Maunz et al.

(10) Patent No.: US 11,587,006 B2
(45) Date of Patent: Feb. 21, 2023

(54) WORKFLOW DEPLOYMENT

(71) Applicant: HEXAGON TECHNOLOGY CENTER GMBH, Heerbrugg (CH)

(72) Inventors: Johannes Maunz, Rebstein (CH); Bernd Reimann, Heerbrugg (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 0 days.

(21) Appl. No.: 15/734,933

(22) PCT Filed: Jun. 7, 2019

(86) PCT No.: PCT/EP2019/065033
§ 371 (c)(1),
(2) Date: Dec. 3, 2020

(87) PCT Pub. No.: WO2019/234244
PCT Pub. Date: Dec. 12, 2019

(65) Prior Publication Data
US 2021/0232990 A1    Jul. 29, 2021

(30) Foreign Application Priority Data
Jun. 8, 2018   (EP) .................................... 18176798

(51) Int. Cl.
*G06Q 10/06*   (2012.01)
*G02B 27/64*   (2006.01)
(Continued)

(52) U.S. Cl.
CPC ......... *G06Q 10/0633* (2013.01); *G01C 11/00* (2013.01); *G02B 27/648* (2013.01);
(Continued)

(58) Field of Classification Search
CPC combination set(s) only.
See application file for complete search history.

(56) References Cited

U.S. PATENT DOCUMENTS

| | | |
|---|---|---|
| 7,735,060 B2 | 6/2010 | Harvey |
| 7,917,654 B2 | 3/2011 | Toivonen |
| (Continued) | | |

FOREIGN PATENT DOCUMENTS

| | | |
|---|---|---|
| CN | 103886139 | 6/2014 |
| EP | 2629210 | 8/2013 |
| (Continued) | | |

OTHER PUBLICATIONS

D. Rathnayake, A. Wickramarachchi, V. Mallawaarachchi, D. Meedeniya and I. Perera, "A Realtime Monitoring Platform for Workflow Subroutines," 2018 18th International Conference on Advances in ICT for Emerging Regions (ICTer), 2018, pp. 41-47, doi : 10.1109/ICTER.2018.8615557. (Year: 2018).*

(Continued)

*Primary Examiner* — Crystol Stewart
(74) *Attorney, Agent, or Firm* — Maschoff Brennan

(57) ABSTRACT

A workflow deployment system comprising at least one computing device having a memory unit and a first communication unit, and a plurality of software agents, wherein each software agent is installable on an electronic apparatus of the plurality of electronic apparatuses, wherein each software agent exchanges data with the electronic apparatus, wherein the memory unit stores workflow data related to a workflow for performing a task, the workflow comprising at least a first workflow package for a first part of the task, wherein the computing device assigns the first workflow package to the first apparatus, and to provide workflow data related to the first workflow package to the software agent of the first apparatus, to receive a problem solution request from the software agent, to perform, upon reception of the request, a workflow modification process; and to provide the customized data to the software agent of the first apparatus.

13 Claims, 9 Drawing Sheets

(51) Int. Cl.
  *G01C 11/00*   (2006.01)
  *G09B 23/04*   (2006.01)
  *G06K 9/00*    (2022.01)
  *B64G 1/10*    (2006.01)
  *G01C 15/00*   (2006.01)
  *G05B 23/02*   (2006.01)
  *G06F 8/60*    (2018.01)
  *G06V 20/52*   (2022.01)
  *G06Q 10/0633* (2023.01)
  *G06Q 10/0631* (2023.01)

(52) U.S. Cl.
  CPC ............ *G06F 8/60* (2013.01); *G06K 9/00523* (2013.01); *G06Q 10/06311* (2013.01); *G06Q 10/06316* (2013.01); *G06V 20/53* (2022.01); *G09B 23/04* (2013.01); *B64G 2001/1028* (2013.01); *B64G 2001/1035* (2013.01); *G01C 15/00* (2013.01); *G05B 23/0275* (2013.01); *G06V 2201/07* (2022.01)

(56) References Cited

U.S. PATENT DOCUMENTS

| | | | | |
|---|---|---|---|---|
| 2003/0043058 | A1* | 3/2003 | Jamieson | G01S 17/933 340/961 |
| 2008/0005287 | A1 | 1/2008 | Harvey | |
| 2008/0010631 | A1 | 1/2008 | Harvey | |
| 2009/0080697 | A1* | 3/2009 | Kishikawa | G01C 15/00 382/103 |
| 2012/0323534 | A1* | 12/2012 | Kahle | G01C 15/00 703/1 |
| 2013/0096874 | A1* | 4/2013 | Laabs | G01C 15/00 702/150 |
| 2014/0192159 | A1 | 7/2014 | Chen | |
| 2014/0268064 | A1 | 9/2014 | Kahle | |
| 2014/0291024 | A1* | 10/2014 | Sugiura | E21B 7/04 175/45 |
| 2015/0067097 | A1* | 3/2015 | Hsia | G06Q 10/06311 709/217 |
| 2015/0085105 | A1* | 3/2015 | Maynard | G01C 15/00 348/135 |
| 2018/0113234 | A1* | 4/2018 | Ye | G01V 8/10 |
| 2018/0307222 | A1 | 10/2018 | Winistörfer | |
| 2019/0354914 | A1* | 11/2019 | Nicholas | G06Q 10/06395 |
| 2020/0026720 | A1* | 1/2020 | Liu | G06T 17/05 |
| 2020/0226352 | A1* | 7/2020 | Coulter | G06V 20/40 |
| 2021/0358161 | A1* | 11/2021 | Caporizzo | G06T 3/40 |

FOREIGN PATENT DOCUMENTS

| | | |
|---|---|---|
| EP | 3156898 A1 | 4/2017 |
| EP | 3392811 A1 | 10/2018 |
| EP | 3522003 | 8/2019 |
| JP | 5489310 | 5/2014 |

OTHER PUBLICATIONS

European Search Report dated Dec. 6, 2018 as received in Application No. 18176798.9.
Anonymous 'Kubernetes—Wikipedia' Jan. 28, 2018.
Geo Instruments 'Automated Total Stations—AMTS—Geo-Instruments' Mar. 14, 2017.

* cited by examiner

WORKFLOW DEPLOYMENT

CROSS-REFERENCE TO RELATED APPLICATIONS

This application claims priority to European Patent Application No. 18176798.9, filed on Jun. 8, 2018. The foregoing patent application are incorporated herein by reference.

FIELD OF THE INVENTION

The present invention pertains to a workflow deployment system and method for generating a task-specific workflow to perform a task jointly on a plurality of existing devices. More particularly, the invention relates to a configuration of surveying instruments by imparting new functionalities, to problem solution in the cloud, or to coordinating several devices, e. g. by distributing surveying tasks from one device to more than one.

BACKGROUND

In the art of general construction work such as building construction and civil engineering, important key factors are planning, progress observation, documentation and appropriate accounting. In many instances, those aspects are getting more and more complex and dynamic, in particular due to the many parties involved, fluctuating human and/or objective resources, increased complexity of the end results, tighter schedules, increased costs of human resources, etc. Work that was formerly planned and overseen by a single manager is nowadays too complex for a single person and a splitting between multiple people often miscarries at the thereby uprising interfaces.

Therefore, it has been tried to expand automation and computerization in this technical field by using building information models (BIM). In the art of building construction, the documents EP 2 629 210, JP 5489310, CN 103886139, US 2014/268064 or US 2014/192159 provide examples of so-called BIM-System approaches.

In the patent application EP18155182.1, a system "Edge Client" (EC) is described that provides extensible IoT edge solution, process automation, secure edge connectivity and dynamically changeable workflows. It can be used together with a system and data integration software such as "Edge-Frontier" (EF) of Intergraph. Some integration tools that can be used with EC are disclosed in documents EP 3 156 898 A1, US 2008/0005287 A1, US 2008/0010631 A1 or U.S. Pat. No. 7,735,060 B2.

U.S. Pat. No. 7,917,654 B2 discloses a system for synchronizing data between a host client and a field device via a virtual field device.

BRIEF DESCRIPTION

Methods and systems described in prior art however are not concerned with modifying workflows if unexpected problems occur or are predicted.

It is therefore an object of some embodiments of the present invention to provide an improved method and system for workflow deployment.

It is another object of some embodiments of the present invention to provide such a method and system that allow modifying workflows when a problem with an existing workflow is reported, predicted or expected.

Particularly, it is an object to provide such a method and system that can be used with existing devices, legacy systems, and untrained users.

In particular, it is an object to provide such a method and system wherein automatic workflow modification is enabled.

Another object is to provide such a method and system wherein a work package is re-assignable so that it can be performed jointly by two or more devices.

It is a further object to provide such a method and system wherein the task is a measuring task and the devices are measuring devices, particularly surveying and reality capture devices.

At least one of these objects is achieved by the system according to claim 1, the method according to claim 12 and/or the dependent claims of the present invention.

A first aspect of some embodiments of the invention relate to a workflow deployment system comprising at least one computing device having a memory unit and a first communication unit, and a plurality of software agents that are adapted to be used with a plurality of electronic apparatuses. Each software agent is installable on an electronic apparatus of the plurality of electronic apparatuses or installed on a communication module that is adapted to be connected to one of the electronic apparatuses and to exchange data with the apparatus connected to, wherein each software agent is adapted to exchange data with the electronic apparatus it is installed on or connected to.

According to this aspect of the invention, the memory unit is adapted to store workflow data related to a workflow for performing a task, the workflow involving at least a first apparatus of the plurality of apparatuses and comprising at least a first workflow package for a first part of the task. The computing device is adapted to assign the first workflow package to the first apparatus, and to provide workflow data related to the first workflow package to a first software agent of the first apparatus, and the first software agent is adapted to monitor and/or predict the occurrence of a problem that incapacitates the first apparatus to perform the first part of the task. If the occurrence of a problem is detected or predicted, the system is adapted to perform a workflow modification process for performing at least the first part of the task in a modified way, the workflow modification process comprising generating customized data related to a modified first workflow package.

According to a some embodiments of the system, the first apparatus is a measuring device and the first part of the task comprises a measuring task. In this case, the customized data may comprise reconfiguration data that is adapted to reconfigure the first apparatus to adapt a measuring precision and/or a measuring programme speed of the first apparatus. The first apparatus for instance may be a geodetic surveying device, industrial measuring device, motorized imaging device or reality capture device, in particular comprising a total station, a laser tracker or a laser scanner.

In one embodiment of the system, the first software agent is adapted to monitor and/or predict the occurrence of a problem that comprises a presence of one or more persons and/or objects in a measurement area of the first apparatus. The presence of the one or more persons and/or objects may constitute an obstruction for the measurement task, for instance if the one or more persons and/or objects block a line of sight between the first apparatus and a target to be measured.

In one embodiment of the system, the first software agent is adapted to predict the obstruction for the measurement task. For instance, the system comprises optical sensors for monitoring a movement of one or more persons and/or objects in a surrounding of the measurement area and to predict the obstruction based on the movement. Said optical sensors may comprise at least one overview camera. The first apparatus optionally comprises at least a part of the optical sensors.

In one embodiment, predicting the obstruction comprises predicting at least a point of time at which the obstruction begins, particularly wherein predicting the obstruction also comprises predicting a duration of the obstruction and/or whether the obstruction is permanent. Monitoring the movement of an object may comprise monitoring a trajectory and speed of the object, and predicting the point of time at which the obstruction begins may comprise interpolating a speed and direction of the object.

In one embodiment, monitoring the movement of a person or an object comprises monitoring and learning at least one typical movement path of previously passing objects or persons, preferably together with a typical or average speed of the previously passing objects or persons along each movement path.

According to another embodiment, each object is assigned to at least one person, wherein the workflow modification process comprises identifying the one or more persons that are present in the measurement area and/or are assigned to at least one object that is present in the measurement area, and sending a notification to an electronic device assigned to each of the identified persons. In particular, each notification comprises information about the measurement task and an instruction to leave the measurement area and/or to remove the at least one assigned object from the measurement area.

According to another embodiment, the first software agent is adapted to monitor and/or predict the occurrence of a problem that comprises a lack of stability of a setup of the first apparatus, e.g. due to an unstable base of the first apparatus and/or an unstable ground on which the first apparatus or a base of the first apparatus is positioned. The base can be a tripod or similar device.

In one embodiment, the first software agent is adapted to monitor a change in an inclination of the first apparatus and to predict, based on this change, at least a point of time at which the inclination passes a threshold value. The threshold value can be defined by the inclination above which the first apparatus is incapacitated to perform the first part of the task, e.g. by loss of a line of sight to a target.

According to another embodiment, the plurality of apparatuses comprises a plurality of measuring devices, particularly comprising total stations, laser trackers or laser scanners.

In one embodiment, a second apparatus of the plurality of apparatuses is a measuring device, in particular a measuring device of the same kind as the first apparatus. In the context of the workflow modification process, the computing device and/or the first agent is configured to re-assign the first workflow package at least partially to this second apparatus, wherein the customized data comprises modified workflow data that is provided at least to a second software agent of the second apparatus.

In one embodiment, the first part of the measurement task comprises performing a laser-based measurement to a first target, the obstruction comprises a blocking of a line of sight between the first apparatus and the first target, and in the context of the workflow modification process the first part of the measurement task is re-assigned to the second apparatus. The modified workflow data may comprise a modified sequence of instructions, wherein the sequence is modified in accordance to the difference between the location of the first apparatus and the location of the second apparatus.

In one embodiment, the customized data provided to the second software agent comprises reconfiguration data for adjusting laser and receiver filter settings of the second apparatus according to a distance between the second apparatus and the first target.

According to some embodiments of the system, the first software agent is adapted to predict the occurrence of a problem that incapacitates the first apparatus to perform the first part of the task.

In one embodiment, predicting the occurrence of a problem is at least partially based on linear interpolation.

In another embodiment, predicting the occurrence of a problem is at least partially based on supervised machine learning techniques. A training of the machine learning may be performed based on operation, system state and location of the first apparatus.

According to another embodiment of the workflow deployment system, the computing device is adapted
  to generate the workflow for performing the task, the workflow involving one or more of the apparatuses,
  to generate the workflow data for each of the involved apparatuses, the workflow data allowing the respective apparatus to perform a part of the task, and
  to provide the workflow data to the software agents of the involved apparatuses.

According to another embodiment of the workflow deployment system, the first software agent is adapted to generate a problem solution request related to the detected or predicted problem, wherein the computing device is adapted
  to receive the problem solution request from the first software agent,
  to perform the workflow modification process upon reception of the request, wherein the computing device is adapted to generate the customized data based on the request, and
  to provide the customized data at least to the first software agent.

According to yet another embodiment of the workflow deployment system, in the context of the workflow modification process the computing device and/or the first software agent is adapted to analyse the problem of the first apparatus, to determine a solution for the problem, and to generate the customized data based on the solution. In a particular embodiment, the system has access to a machine learning database comprising data sets related to previously reported problems, wherein analysing the problem and determining the solution is based on data set entries from the machine learning database, particularly based on engineering models and/or data driven machine learning models.

According to a further embodiment of the workflow deployment system, the computing device is part of a cloud of interconnected remote computing devices, wherein at least the workflow modification process is performed jointly by a plurality of devices of the cloud, particularly wherein the workflow modification process comprises analysing a problem of the first apparatus in performing the first part of the task, and determining a solution for the problem, wherein the computing device has access to a machine learning database comprising data sets related to previously reported problems, wherein analysing the problem and determining the solution is based on data set entries from the machine learning database.

According to another embodiment of the workflow deployment system, the customized data comprises at least one of modified workflow data and reconfiguration data, wherein the modified workflow data comprises instructions for the first apparatus to perform the first part of the task in a modified way, and the reconfiguration data is adapted to reconfigure the first apparatus for providing functions that allow or improve performing the first part of the task.

According to yet another embodiment of the workflow deployment system, in the context of the workflow modification process the computing device and/or the first agent is configured to re-assign the first workflow package at least partially to a second apparatus of the plurality of apparatuses, wherein the customized data comprises modified workflow data that is provided at least to a second software agent of the second apparatus. In a particular embodiment the first workflow package is re-assigned to involve at least two cooperating apparatuses that work together to perform the first part of the task, and the customized data is provided to said cooperating apparatuses and comprises reconfiguration data that is adapted to reconfigure at least one of the cooperating apparatuses for providing functions that enable the cooperating apparatuses to work together.

According to a further embodiment of the workflow deployment system, in the context of the workflow modification process the computing device and/or the first agent is configured to request and receive from the plurality of agents task-specific data of the apparatuses, wherein the task-specific data comprises information about properties, a position and/or a workload that are associated with the respective apparatus, wherein the first workflow package is re-assigned based on the task-specific data.

According to yet another embodiment of the workflow deployment system, at least one of the software agents is installed on a communication module that is adapted to be connected to one of the electronic apparatuses and to exchange data with the apparatus connected to, wherein each of the communication modules comprises a communication unit adapted to communicate and exchange data with the first communication unit, particularly wherein a communication module with a first software agent is connected to the first apparatus.

A second aspect of some aspects of the invention relate to a method for deploying a workflow, the method comprising
providing a workflow deployment system, such as a workflow deployment system according to the first aspect of the invention, wherein the workflow deployment system comprises a computing device having a memory unit and a first communication unit, and
providing a software agent to each one of a plurality of electronic apparatuses, wherein each software agent is adapted to exchange data with the electronic apparatus and wherein providing the software agent comprises installing a software agent on the apparatus or connecting a communication module to the apparatus, wherein a software agent is installed on the communication module.

According to this aspect of the invention, the method further comprises
providing, at the workflow deployment system, workflow data related to a workflow for performing a task, the workflow involving at least a first apparatus of the plurality of apparatuses and comprising at least a first workflow package for a first part of the task,
assigning, by the workflow deployment system, the first workflow package to the first apparatus,
providing workflow data related to the first workflow package to the software agent of the first apparatus,
monitoring or predicting, by the software agent of the first apparatus, an occurrence of a problem related to performing the first part of the task, and
performing, if a problem has occurred or is predicted to occur, a workflow modification process for performing at least the first part of the task in a modified way, the workflow modification process comprising generating customized data related to a modified first workflow package.

According to one embodiment of the method, the software agent of the first apparatus generates a problem solution request, the request comprising problem information related to the problem, the workflow deployment system receives the request and performs the workflow modification process, in the context of which the computing device generates, based on the problem information, customized data, and the workflow deployment system provides the customized data to the software agent of the first apparatus.

According to another embodiment the method further comprises
generating the workflow for performing the task, the workflow involving one or more of the apparatuses,
generating the workflow data for each of the involved apparatuses, the workflow data allowing the respective apparatus to perform a part of the task, and
providing the workflow data to the software agents of the involved apparatuses.

According to some embodiments of the method
the first apparatus is a measuring device, in particular a total station, laser tracker or laser scanner,
the first part of the task comprises a measuring task, and
the first software agent is adapted to predict an obstruction for the measurement task, the obstruction e.g. comprising one or more persons and/or objects blocking a line of sight between the first apparatus and a target to be measured in the course of the measuring task.

In one embodiment, the method comprises monitoring a movement of one or more persons and/or objects in a surrounding of the measurement area and predicting the obstruction based on the movement.

In one embodiment, the method comprises using optical sensors for monitoring the movement, particularly wherein the optical sensors comprise at least one overview camera, and/or the first apparatus comprises at least a part of the optical sensors.

In another embodiment of the method, predicting the obstruction comprises predicting at least a point of time at which the obstruction begins, particularly wherein predicting the obstruction also comprises predicting a duration of the obstruction and/or whether the obstruction is permanent.

In another embodiment of the method,
monitoring the movement of an object comprises monitoring a trajectory and speed of the object; and
predicting the point of time at which the obstruction begins comprises interpolating a speed and direction of the object.

In another embodiment of the method, monitoring the movement of a person or an object comprises monitoring and learning at least one typical movement path of previously passing objects or persons, particularly together with a typical or average speed of the previously passing objects or persons along each movement path.

According to some embodiments, the method comprises monitoring and/or predicting the occurrence of a problem that comprises a lack of stability of a setup of the first apparatus, e.g. due to an unstable base of the first apparatus and/or an unstable ground on which the first apparatus (or its base) is positioned.

In one embodiment, the method comprises monitoring a change in an inclination of the first apparatus and predicting, based on the change, at least a point of time at which the inclination passes a threshold value, particularly wherein an inclination above the threshold value incapacitates the first apparatus to perform the first part of the task.

According to some embodiments, the method comprises predicting the occurrence of a problem that incapacitates the first apparatus to perform the first part of the task, wherein predicting the occurrence of a problem is at least partially based on linear interpolation or on supervised machine learning techniques, particularly wherein a training of the machine learning is performed based on operation, system state and location of the first apparatus.

A third aspect of some aspects of the invention relate to a computer programme product comprising programme code which is stored on a machine-readable medium, or being embodied by an electromagnetic wave comprising a programme code segment, and having computer-executable instructions for performing, in particular when run on a computing device of a system according to the first aspect of the invention, at least the following steps of the method according to the second aspect of the invention:
- providing workflow data related to a workflow for performing a task, the workflow involving at least a first apparatus of the plurality of apparatuses and comprising at least a first workflow package for a first part of the task,
- assigning the first workflow package to a first apparatus of the plurality, of apparatuses,
- providing workflow data related to the first workflow package to the software agent of the first apparatus,
- monitoring, by the software agent of the first apparatus, an occurrence of a problem related to performing the first part of the task, and
- performing, if a problem has occurred, a workflow modification process for performing at least the first part of the task in a modified way, the workflow modification process comprising generating customized data related to a modified first workflow package.

BRIEF DESCRIPTION OF THE DRAWINGS

The invention in the following will be described in detail by referring to exemplary embodiments that are accompanied by figures, in which.

DETAILED DESCRIPTION

Figure 1:
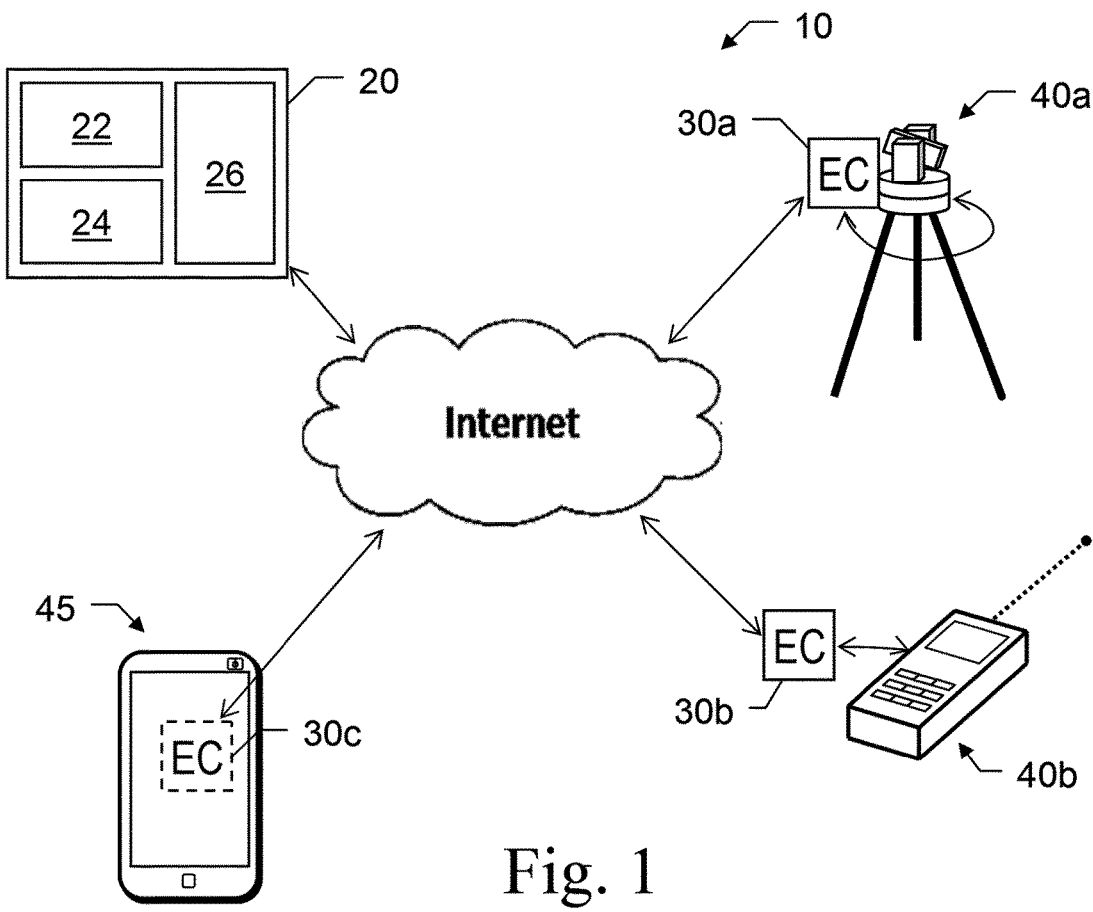
FIG. 1 shows a first exemplary embodiment of a system according to the invention.

FIG. 1 illustrates an exemplary embodiment of a workflow deployment system 10 according to the invention. The shown system 10 comprises a computing device 20 and three software agents 30a-c (EC), wherein two agents are provided in agent modules 30a-b, each of which being connected to surveying devices 40a-b, and one software agent 30c is installed directly on a user device 45, e. g. as a mobile device application ("app").

Although the depicted devices 40a-b in these examples are adapted as surveying devices, the agents can also be provided in or at other kind of devices. These can be actuating devices like machine tools, industrial machines, manufacturing robots or construction machinery. Also other kinds of measuring devices than the depicted ones can be used, e. g. reality capture devices, laser trackers or total stations. Also unmanned aerial or ground vehicles (UAV/UGV) comprising surveying or other measuring equipment can be used, e. g. surveying drones or inspection robots.

The modules 30a-b with the agents installed thereon are connected to external devices 40a-b and adapted to exchange data with the respective connected device. For instance, such a connection might include using a universal serial bus (USB) or other hardware interface or a wireless data connection such as Bluetooth.

In the shown example, the devices comprise a laser scanning device 40a, a hand-held laser distance meter 40b, and a portable electronic device 45 that is assigned to a certain user. For instance, the portable device 45 can be a smartphone or tablet PC or a wearable such as a smart watch. As device 45 is adapted to allow installing external software or deploying a set of microservices, the respective agent 30c can be provided as a software application directly in the external device 45 instead of being provided in a module that is connectable to the device 45. It is also possible to provide the software by app delivery, e. g. by means of a mobile app that can be used for a certain workflow only or for a multitude of different workflows.

The computing device 20 comprises a computing unit 22 having a processor, a memory unit 24 adapted for storing data, and a communication unit 26 (e. g. comprising a modem) allowing data interchange with the agents 30a-c.

Alternatively, the computing device 20 can be embodied by a plurality of devices, with a user device operated by a user and further devices for performing the computing. Also, the application may run in a cloud. The computing device 20 may optionally also be embodied by a cloud or a plurality of devices.

As shown, the computing device 20 can be connected via the Internet with the remote agent modules 30a-b and the portable device 45 comprising the third agent 30c. This is especially useful, if a direct data transfer is not possible because the devices are positioned at a larger distance from each other, e. g. more than a hundred meters away, or if, for instance, a workflow comprises capturing data of a skyscraper with multiple measuring devices positioned in several stories of the building.

Alternatively, the computing device 20 and the agents 30*a-c* can be grouped locally together and connected with each other, for instance wirelessly, e. g. by means of a wireless local area network (WLAN) or by means of mesh networks such as LoRa (Long Range Wide Area Network) or ZigBee or Bluetooth. Also, some devices or modules may be connected via Internet and others connected locally to the computing device 20. Also, devices or modules can have both local and cloud connections.

The computing device 20 can be a user device such as a personal computer that is operated by a user and comprises input means such as keyboard and mouse for entering or selecting a task to be performed by the devices 40*a-b*, 45. Alternatively, especially in case of the second embodiment, the computing device 20 can be another portable device (such as the user device 45).

Task-specific workflows can be deployed on-demand and in a real-time manner to remote devices 40*a-b* as well as to other software applications or modules that run on the agent modules 30*a-b* or the second user device 45 and if needed may include human interaction. The workflow may also include coordinating interaction between two or more humans who are part of a specific workflow.

This allows sending customized on-demand step-by-step workflows to guide one or more users in carrying out a given operation or even allows unguided execution of these workflows. The workflows can comprise instructions for only human, or only machine, or both. It means that advantageously even a novice person can operate complex equipment and can carry out a complex job based on the on-demand workflow.

For example, a guided workflow on how to measure or layout a given object using any measurement devices (for example, as shown, a scanner 40*a* and a distance meter 40*b*) is sent on-demand via a cloud directly to the devices and machines. Advantageously, these workflows can be deployed to the agents in the measuring devices without rebuilding or changing the firmware. The cloud can be in the internet as well as a local cloud setup.

In addition, a high-level workflow can be sent to a hand-held device 45 of a user if a human input is needed. The input may simply comprise an authorization or a command to start the operation. Additionally, the input may comprise a prioritization of options. In a similar manner, further devices or entities can join the solution to provide additional services in the setup. As an example, an application running on a smart watch can monitor the process and subscribe to the warnings or errors, depending on the system configuration, to alert the user in a real-time manner. Similarly, the same application can be reconfigured in real-time to additionally also track the user. This can be used as part of the solution to provide value-added services like fatigue-monitoring. The wearables (smart watches, AR/VR devices, activity trackers, etc.) can provide a natural extension for edge intelligence platforms to sense and provide data and services to the user. Summarizing, this solution provides all the flexibility to augment an existing solution with new capabilities, to change the behavior of an existing system, or to reconfigure the solution to provide new services.

Such a high-level workflow can also be sent to multiple human users. For example, a scan measurement where one user is required to move a scanner to the next scanning position while another user gets real-time notifications to remove obstructions while the scan is in progress and yet another human user as a first verifier in the loop before committing the scans to the repository. Advantageously, none of these persons need to be pre-trained for such a complex setup. It is even possible to change the workflow every day without any pre-training of the involved personnel being required.

For instance, all users in or nearby the area of a scan or other measurement can get a notification on a mobile device to clear and not to enter the affected area for the time approximated for the measurement to be performed.

Advantageously, the device workflow can be adapted to the knowledge of a user and tailored to specific applications, situations and users. Optionally, a level of education or know-how of the operator can be detected (e. g. by means of machine learning), and workflows can be modified according to local regulations. In addition, the workflows can also be generated dynamically to take into consideration the situation at hand, e. g. capabilities of available devices, device health status, and device failure prediction, etc. Feedback about the quality of the job can be computed in real-time based on the achieved results and on key performance indicators (KPI), e. g. also based on past results or KPI.

For instance, a step-by-step workflow is sent to the hand-held device 45 of a forensic investigator to accurately and efficiently capture all the relevant details from a crime scene that may also involve different measurement devices 40*a-b* or other devices necessary to carry out this job. The workflow can be auto-generated based on various factors, e. g. on the nature and location of the crime scene, forensic devices present, technical know-how of the forensic investigator, other persons or agencies involved, etc.

The workflows mentioned above can be generated locally based on the local inputs to the system 10; they can also be computed in a cloud, optionally being also based on inputs from other sources or on the analytics on the previous and current data, e. g. using digital twin models combining and comparing engineering and data analytics driven approaches.

A generated workflow can be deployed via the agent modules 30*a-c* from the cloud to a user device (e. g. a hand-held device 45) and thus to a human, to the measuring devices 40*ab*, or to both.

The workflow may also be deployed only to a user device 45 which controls the other devices 40*a-b*. For example, the user starts his application in a construction site, the application takes inventory of all available devices and enumerates their capabilities and sends this information to the cloud. The user then enters his wish to carry out a certain action, e. g. check if a building has been built according to the specifications. This input is processed by the cloud/local analytics engine and based on the available devices & resources. A customized workflow is generated and downloaded to the user device 40*c* which then guides the users, as well as controls the machines, to complete the job at hand.

In addition to the dynamically deployable workflows, the system may optionally also provide a functionality to orchestrate new functionalities for the devices 40*a-c*. These new functionalities may comprise e. g. algorithms, fog analytics, control system strategies or safety & security features.

This is possible e. g. through a combination of publishing of device information and reflection (="self-description") of the devices' capabilities. The integration of all this information allows the orchestration of algorithms, analytics, etc.

with the deployment of new workflows to specific systems. The system can play the role of the orchestrator of many systems with its ability to deploy workflows to other systems. Depending on the situation, one of the agents can also take the role of an orchestrator to manage other agents.

Also virtual devices can be formed that have capabilities of different devices merged. Devices can learn to understand, group and tailor device functionalities. Other devices can be mimicked. For instance, a total station, such as e. g. the Leica Nova MS60, could mimic the functions of a laser scanner, a handheld distance meter or even a plumb.

Figure 2:
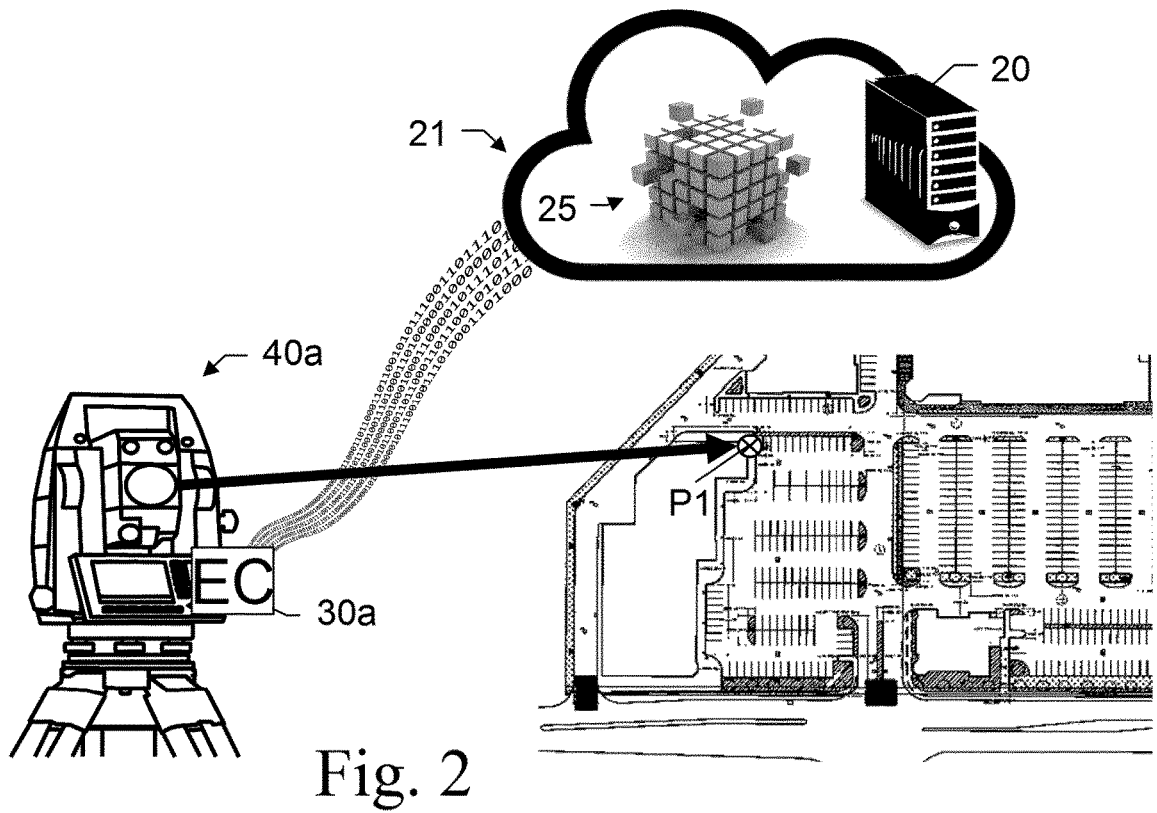
FIG. 2 shows a second exemplary embodiment of a system according to the invention.

FIG. 2 shows a total station 40a as an example of an apparatus that is provided with an agent module 30a to be connected with the computing device 20. The computing device 20 in this embodiment is part of a cloud 21 that runs the application. The cloud provides analytics functionality 25 using a database to allow machine learning, e. g. for automatically providing solutions when problems are reported by the total station 40a, its software agent 30a or its user.

If a user is out in the field with a device like the total station 40a, applications providing "smartness" to the device are provided within client software on the device itself or on a mobile user device, such as a tablet computer. If the software reaches a point where its "smartness" cannot solve a given task, the device and its user get stuck. If the user is experienced enough, he might be able to solve the problem manually. Otherwise, the task cannot be accomplished or a mistake occurs and is noticed only at a later point in time, if at all. The device can solve the issue only if the software providing the necessary "smartness" is available on the device or tablet.

In accordance with the present invention, if the device 40a gets stuck at a point while performing a task, it requests analysis from a central computing device 20 or from a cloud computing network 21 (cloud) comprising such computing devices 20. Based on learning from past data or by re-optimizing the overall process according to the new circumstances, the cloud 21 generates a workflow, e. g. a script which simply changes a behaviour of the device.

The workflow is deployed to the device, the device or tablet software executes the workflow and solves the issue. Successful execution and problem solving is fed back to the cloud 21 as feedback to the workflow. The feedback can then be gathered centrally and re-deployed when similar problems arise. Likewise, unsuccessful problem solving can be fed back as well. Both approaches improve by so-called reinforcement learning the capabilities of the underlying machine learning model to improve the machine learning.

The cloud 21 provides advanced analytics 25 that interacts with the device or tablet software.

The presented method for workflow deployment avoids "fat clients" that have a limited capability of solving issues if the installed algorithms reach their end at some point. With the presented method for deploying workflows, instruments in the field can change their behaviour when one algorithm reaches a dead end. A workflow can be deployed to learn and a new workflow can be deployed which solves this issue.

In one exemplary embodiment, the device is received at the customer, produced from stock and pre-customized for the customer. Once the customer starts the device, he needs to bring it online. The installed software agent 30a requests workflows for configuration of device, and the device is customized in the field.

In another exemplary embodiment, the system is adapted for machine-to-machine (M2M) task dispatching. On big sites, where several stake out tasks being executed in parallel, if one instance finishes, the others would not recognize this. With the proposed solution, every device would be able to share its work with others, even when offline and having machine-to-machine communication. This would create a Virtual Measurement Instrument as the sum of all sub-capabilities of all the instruments in the field, allowing e. g. prevention of redundancies or enhancing speed in surveying tasks using several scanners, or overall optimization of the usage of the fleet of devices.

Figure 3:
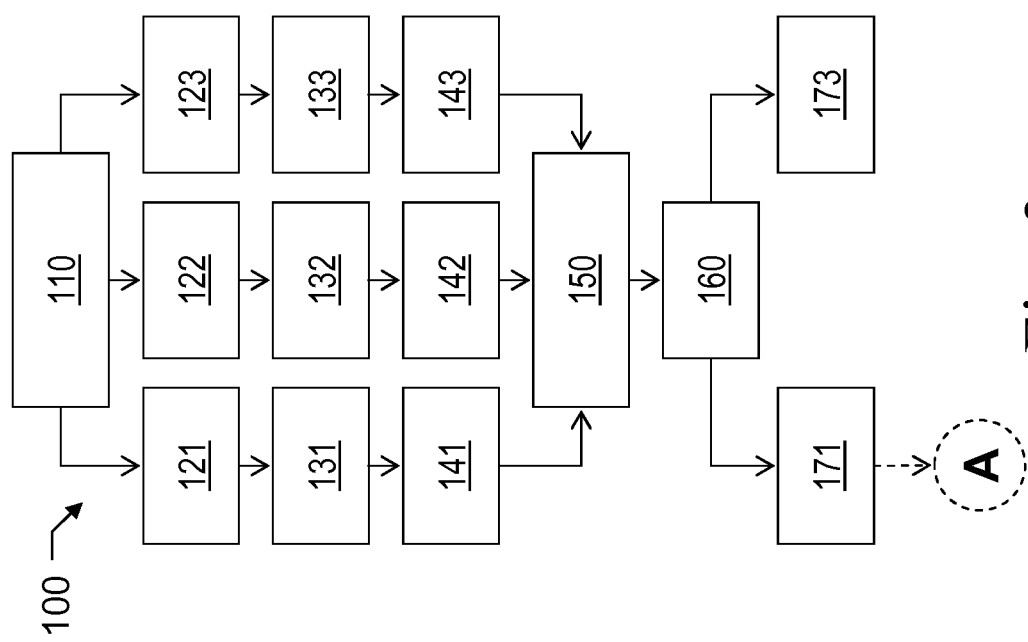
FIG. 3 illustrates an exemplary method for generating a workflow.

FIG. 3 shows a flowchart illustrating an exemplary method 100 for generating a workflow, as already described in the applicant's European patent application EP18155182.1. According to some embodiments, such a method 100 can be a part of or precede a method according to the invention.

In a first step 110 a task is received, e. g. through a user input in a computing device. This device requests task specific data of a plurality of remote devices from a plurality of connected software agents that provide a functionality or feature set. In this example there are three devices A, B and C, so that the method 100 comprises three steps 121-123 that can be performed basically simultaneously: step 121 requesting task specific data of device A, step 122 requesting task specific data of device B and step 123 requesting task specific data of device C. Subsequently, in steps 131, 132 and 133 the requested task specific data of devices A, B and C is received by the device, and in steps 141, 142 and 143 task-specific abilities of devices A, B and C are assessed by the device. Having assessed all devices' abilities, a workflow can be generated by the device in step 150. Workflow data for each device involved is generated in step 160 and subsequently transmitted to the involved devices in steps 171 and 173. In the shown example, as a result of the ability assessments (steps 141-143), the generated workflow only involves two of the three devices, wherefore only these two need to receive the respective workflow data to perform their part of the task.

Figure 4:
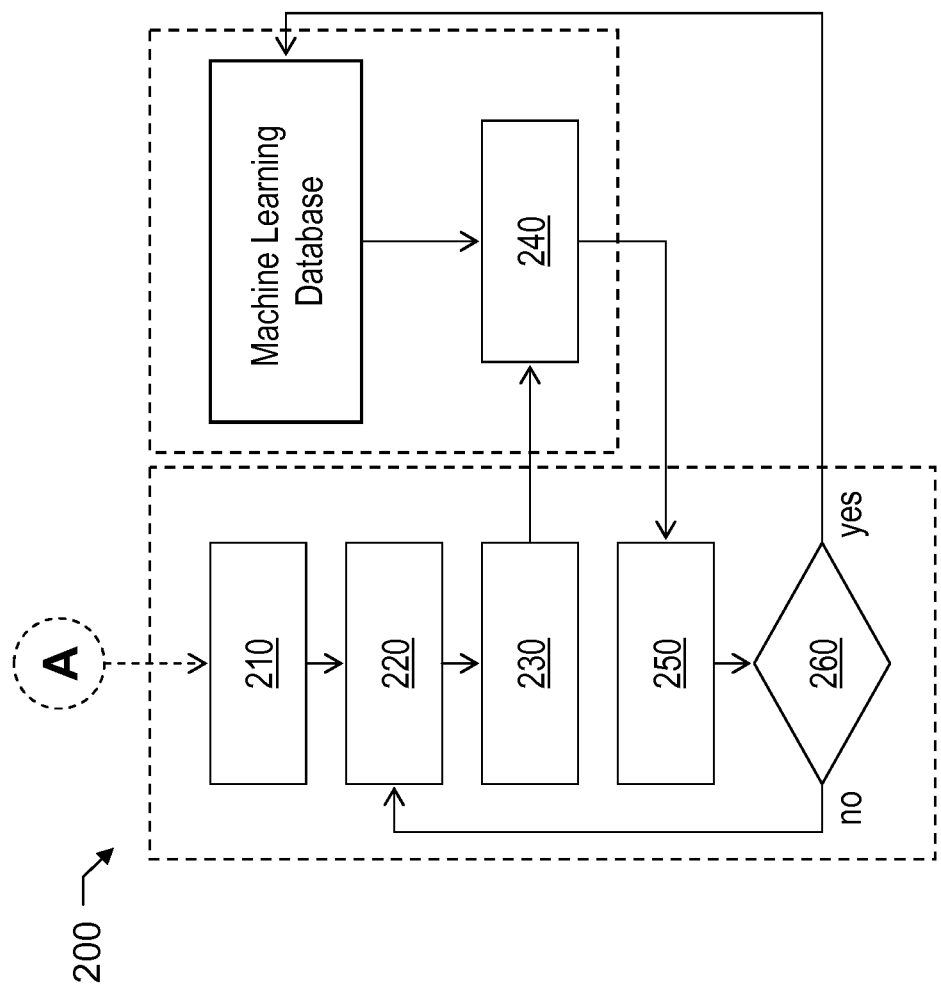
FIG. 4 illustrates an exemplary embodiment of a method for deploying a workflow according to the invention.

FIG. 4 shows a flowchart illustrating an exemplary embodiment of a method 200 for deploying a workflow according to the invention. According to a particular embodiment, the method 100 of FIG. 3 may precede this method or be a part thereof.

In the illustrated embodiment, a workflow package related to a first part of a task is assigned to a first apparatus (step 210). Said apparatus is then provided with respective workflow data that allows the first apparatus to perform the part of the task according to the provided workflow data (step 220). The first apparatus then starts to perform the first part of the task. When the apparatus encounters a problem that it cannot solve, it sends information regarding the problem together with a request for a solution to the computing device (step 230).

Upon reception of the request, the computing device then performs a workflow modification process (step 240). Using a machine learning database, this process may comprise an analysis of the reported problem and determining a solution for the problem. In response to the request and based on the determined solution, customized data is generated and provided to the apparatus in order to solve the issue (step 250). The customized data can comprise adapted workflow data, e. g. instructions for the first device to perform the first task in a modified way, and/or configuration data, e. g. for reconfiguring the first apparatus for providing functions that allow or improve performing the part of the task.

At the apparatus, it is then determined whether the problem is solved with the adapted workflow (step 260). Feedback is sent to be used in the machine learning database for future problem analyses, e. g. by use of reinforcement learning.

If the determined solution comprises that the part of the task where the problem occurred should be partially or completely re-assigned to one or more other apparatuses, the customized data is also provided to these apparatuses.

Problems that might be determined or predicted by an apparatus for instance comprise a lack of battery power for completely performing the assigned task, obstructions in the working area, such as a mobile object blocking a field of view of a scanning or surveying task, etc.

Figure 5B:
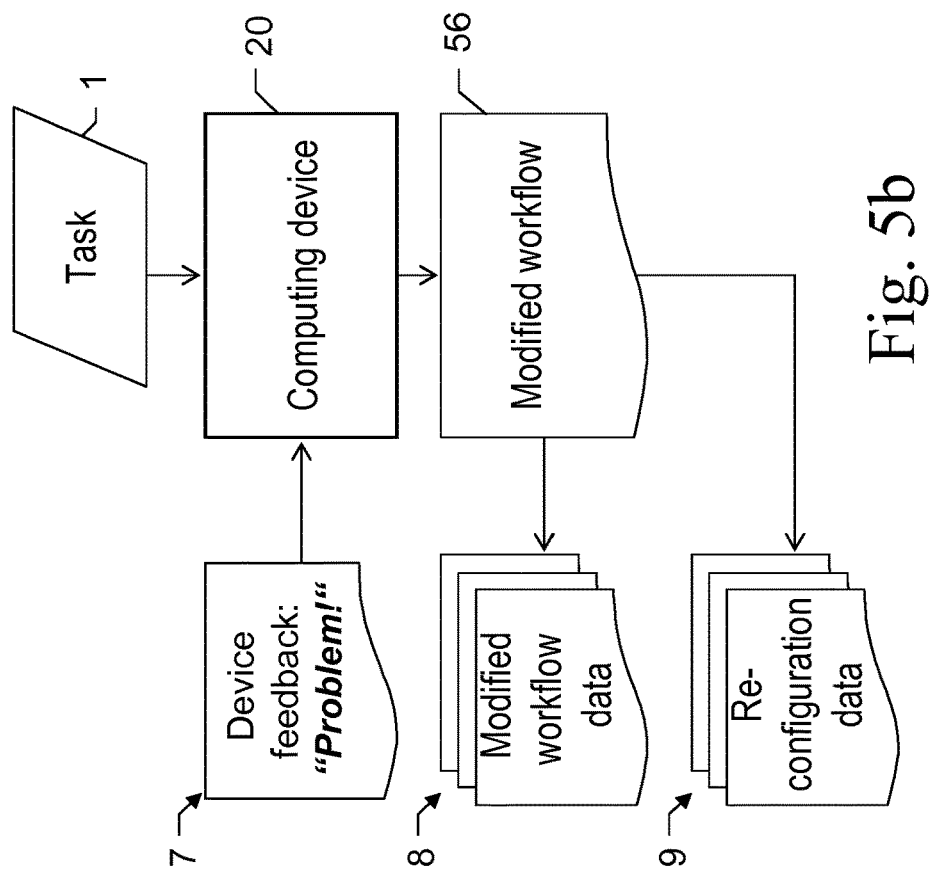
FIG. 5b illustrates the information stream in an exemplary embodiment of a system for deploying a workflow according to the invention.
Figure 5A:
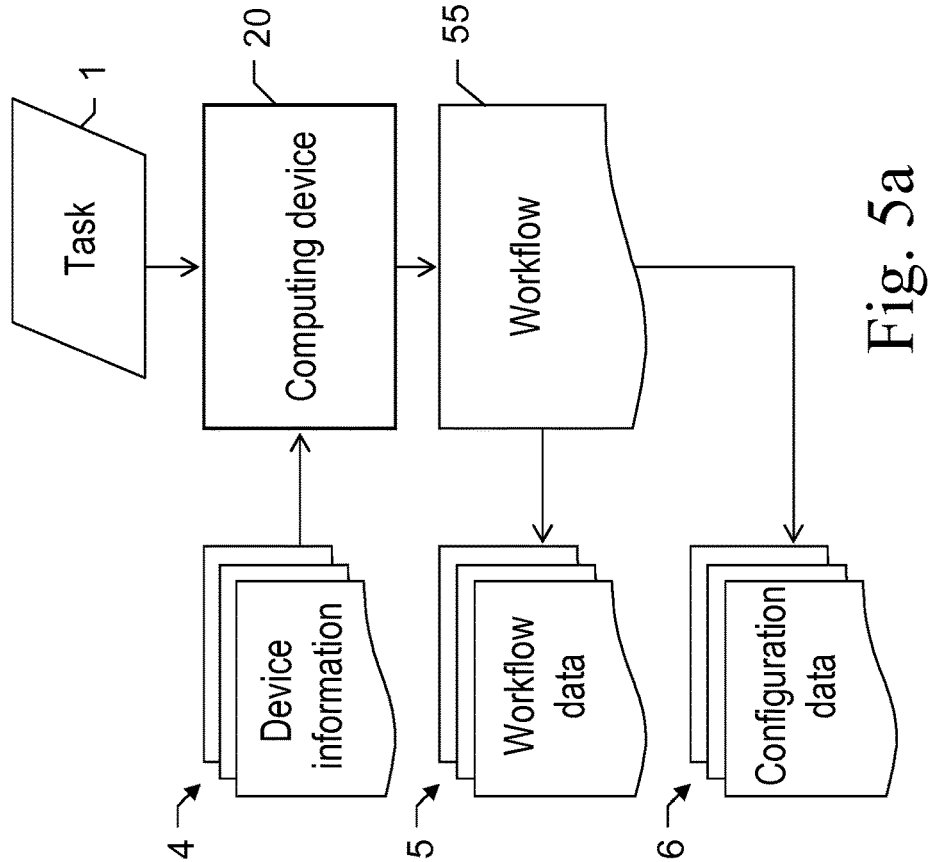
FIG. 5a illustrates the information stream in an exemplary system for generating a workflow.

FIG. 5a illustrates the information stream in a system performing a method according to FIG. 3. The computing device 20 receives information about a task 1 to be performed. Consequently, based on task-related device information 4 of available devices, the computing device 20 assesses the available devices' abilities with respect to the task 1 at hand. Optionally, the task-related device information 4 may be requested and received from the available devices.

Based on the ability assessment, an optimized workflow 55 involving all or some of the devices is calculated by the computing device 20. Workflow data 5 for each of the involved devices is generated that allows the respective device to perform its part of the task 1 as defined in the workflow 55. The workflow data 5 is then transmitted to the involved devices.

Furthermore, based on the workflow 55 and on the device information 4, the computing device 20 is adapted to generate configuration data 6 for one or more of the involved devices and provided it to the software agents of these devices. This configuration data 6 is adapted to reconfigure the device it is provided to in order to allow performing the part of the task according to the workflow.

The configuration data need not be generated for all involved devices. Instead, based on the device information 4, the computing unit 22 assesses which device can be reconfigured in which way in order to allow or improve performing a part of the task by the respective device thus improving the workflow.

Reconfiguration optionally may comprise also configuring a device to comply with company standards and regulations, user limitations, local regulations or environmental conditions.

If the device is a surveying device, the configuration data 6 for example can reconfigure the surveying device to adapt a measuring precision of the device or a measuring programme speed according to the needs given by the task or by the workflow. For instance, in case of a laser scanner, if a scan with only a low resolution is needed to proceed with the next steps of the workflow, the scanner can be reconfigured to perform the scan faster, thus accelerating the whole workflow.

If the scanner does not possess the capability required for this workflow, then the computing device 20 can contact the vendor or manufactures and by payment of a given fee, the feature can be activated in the scanner to continue with the workflow. This functionality is described in detail in EP 3 392 811 A1. Since the system has an overview of the capabilities and measurement speed, given the past metrics, it can potentially also calculate the monetary return (ROI) if a certain new feature needs to be enabled.

If the workflow involves the cooperation of two or more devices to work together to perform the task or a part of the task, and if these two or more devices are generally not adapted to work together, e. g. due to different manufacturers of the devices resulting in incompatible software standards, the configuration data 6 might reconfigure the devices in such a way that allow them to work together to perform the task.

If the device information 4 comprises information about a location of the devices, the configuration data optionally can reconfigure the devices to adapt to certain conditions of the location, such as legal regulations effective at that location. These legal regulations may include safety regulations. For instance, the light intensity of the laser of a distance measuring device can be adapted. The regulations may also include patent rights and the configuration data can deactivate certain protected functions of the devices.

The local conditions can also comprise the use of different systems of units used at different locations. The configuration data then, for instance, can be used to reconfigure all devices involved in the workflow to use the same system of units. Likewise, a standard language in which information is provided to a user of a device can be chosen based on the location, e. g. such that devices depending on language preferences of the user provide information in the most appropriate language.

Especially if the devices are remote devices, the workflow data 5 and configuration data 6 can be sent encrypted.

If the device is a machine, the task-related device information 4 comprises information about properties, a position and/or a workload of the machine, and the workflow data 5 comprises machine-readable instructions.

If the device is a user device, the task-related device information 4 comprises information about the user of the device, e. g. task-related knowledge, and the workflow data 5 comprises instructions for a human.

FIG. 5b illustrates the information stream in an exemplary system according to the invention, performing a method according to FIG. 4. In particular, the information stream of FIG. 5b can succeed that of FIG. 5a.

The computing device 20 (or the application running in the cloud, respectively) receives feedback 7 from one or more of the devices involved in a certain workflow, wherein a problem with performing a certain work package of the workflow is reported.

If a certain device performing a task or a part of a task according to an assigned work package gets stuck at a certain point—be it either due to unforeseen occurrences or circumstances, due to lack of a functionality in the device that would be necessary to perform the task according to the assigned work package, or due to a high failure risk calculated by a means of predictive maintenance algorithms—this is detected by the device and reported by sending problem-related data to the computing device 20. In particular, the device itself or a software agent installed thereon or connected thereto is enabled to detect the problem fully automatically. Alternatively or additionally, a user of the device can manually enter the problem request if the problem cannot be solved on-site easily.

The data related to the problem provided with the feedback is analyzed by the computing device 20, particularly in view of the complete task 1. A modified workflow 56 is generated, in particular using data from a machine learning database (see FIG. 4) to allow learning from past problems and solutions. The modified workflow 56 comprises modifications to the original workflow 55 that can be either restricted to the work package in which the reported problem occurred or can affect also other work packages and even the complete workflow.

The modifications of the modified workflow 56 can affect all or some of the devices involved in the original workflow 55. Modified workflow data 8 for each of the affected devices is generated that allows the respective device to perform its part of the task 1 as defined in the modified workflow 56. The modified workflow data 8 is then transmitted to the affected devices.

Furthermore, based on the modified workflow 56—and particularly also on device information 4 of the affected devices—the computing device 20 is adapted to generate reconfiguration data 9 for one or more of the devices affected by the modifications and provides it to the software agents of these devices. This re-configuration data 9 is adapted to reconfigure the device it is provided to in order to allow performing the part of the task according to the modified workflow 56.

The re-configuration data 9 need not be generated for all involved devices. Instead, the computing device 20 assesses which device needs to be reconfigured in order to perform the task according to its work package assigned in the modified workflow 56.

The modified workflow, for instance, might comprise that the device reporting the problem receives a script as reconfiguration data 9, the script changing the device's behaviour to allow performing the task. Alternatively, a second device might receive modified workflow data 8 comprising the task to perform a part of the task that was originally assigned to the reporting device.

If a reconfigured device is a surveying device, the reconfiguration data 9 for example can reconfigure the surveying device to adapt a measuring precision of the device or a measuring programme speed in view of the reported problem and the overall workflow requirements.

For instance, in case of a laser scanner, if circumstances prevent performing a scan in a given time as planned according to the original workflow 55, the scanner can be reconfigured to perform the scan with less precision but faster, to meet the demands of the whole workflow. If this is not possible, the whole workflow can be modified, e. g. by shifting more scanning devices to the task of the reporting device.

If the scanner does not possess the capability required for the modified workflow 56, then the computing device 20 can contact the vendor or manufactures and by payment of a given fee, the feature can be activated in the scanner to continue with the modified workflow. Since the system has an overview of the capabilities and measurement speed, given the past metrics, it can potentially also calculate the monetary return (ROI) if a certain new feature needs to be enabled.

Figure 6:
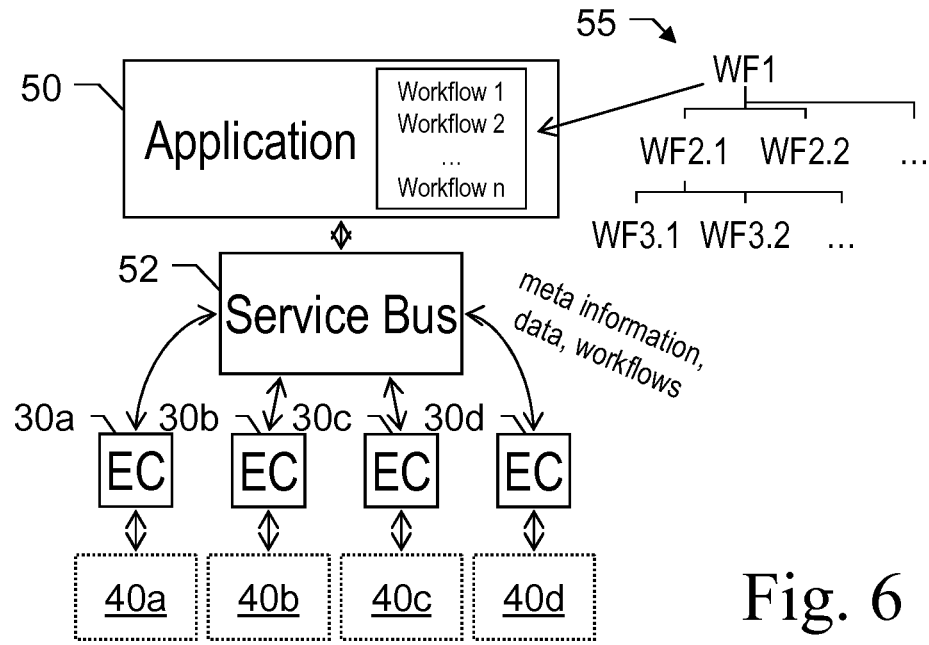
FIG. 6 shows an exemplary application for generating workflows.

FIG. 6 shows an exemplary embodiment of an application 50 with several software agents provided in agent modules 30*a-d* connected to devices 40*a-d* and connected together using a service bus 52. A system according to the invention can comprise several agent modules 30*a-d* connected together using a service bus or a system and data integration software such as EdgeFrontier® (EF) of Intergraph Corporation. Applicable integration tools to be used with the application are generally known in the art and disclosed e. g. in the documents EP 3 156 898 A1, U.S. Pat. No. 7,735,060 B2, US 2008/0005287 A1, and US 2008/0010631 A1.

The application 50 may run one or more workflows (WF) as described by a user using a descriptive language like XML or JSON and programming languages like Java Script and Python. These workflows are decomposed into simpler workflows 55 (WF1, WF2.1, WF2.2, WF3.1, WF3.2, . . . ) that can run on individual modules based on a dependency-tree analysis. This analysis works on the principle that if a workflow meets all of its dependencies in a given agent module 30*a-d*, then it should run locally there. However, if all the dependencies are not met in one module, then a part of the workflow will run at a higher level shown as the service bus 52.

The dependency-tree analysis does not need to be limited to only two levels (module and service bus). In fact, this principle targets the local-most possible execution of the logic in the workflows. If a workflow can run on the module, it will do so. If it needs information from several modules, then these modules can self-coordinate with each other to execute it. In this case the dependencies are expanded to include all of them and exclude all others. Finally, an enterprise service bus can be used if all of the underlying modules are needed as dependencies.

Alternatively, for instance if according to any pre-defined metric it would be more efficient, the logic can be run at the service bus level even though the dependencies are met at any level below it.

Although a server bus is shown in this Figure, in other embodiments, the software agents provided in agent modules 30*a-d* can also be connected directly to the application 50. Particularly, one of the modules 30*a-d* can be responsible for creating workflows, decomposing and dispatching them. Other embodiments comprise a combination of the two approaches, e. g. so that data can flow through the service bus 52 or directly via the agents to the application 50.

If the modules self-coordinate with each other to execute a workflow in a distributed setup there can be an elected master of the workflow that will be responsible for the workflow. This master can be automatically replaced with another module, e. g. if the master goes down because of an anomalous condition.

Figure 7:
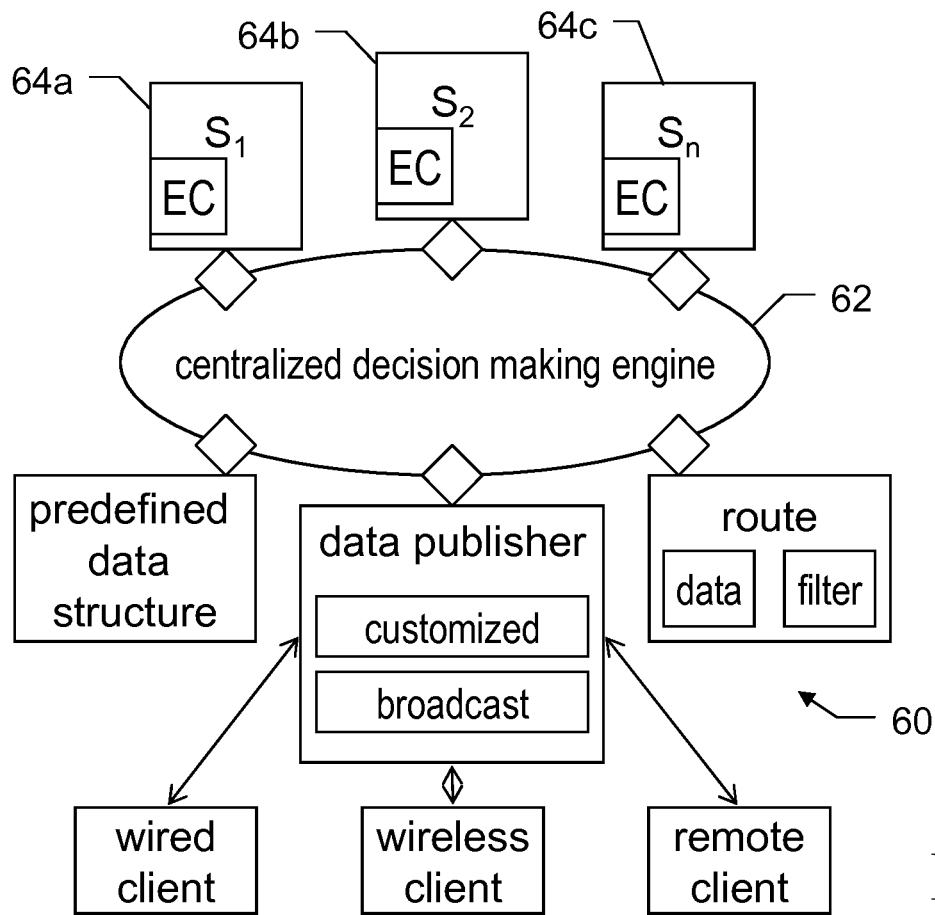
FIG. 7 illustrates an intelligent information platform used together with a system according to the invention.

FIG. 7 illustrates an intelligent information platform that can be used together with a system according to the invention and in some embodiments forms a part of the system according to the invention. In general, such a platform is described e. g. in the document EP 3 156 898 A1. The intelligent information platform provides a fully configurable distributed ERP-like (ERP=enterprise resource plan) information processing platform 60 that routes the information, based on certain rules and policies to a centralized decision-making engine 62.

Figure 8:
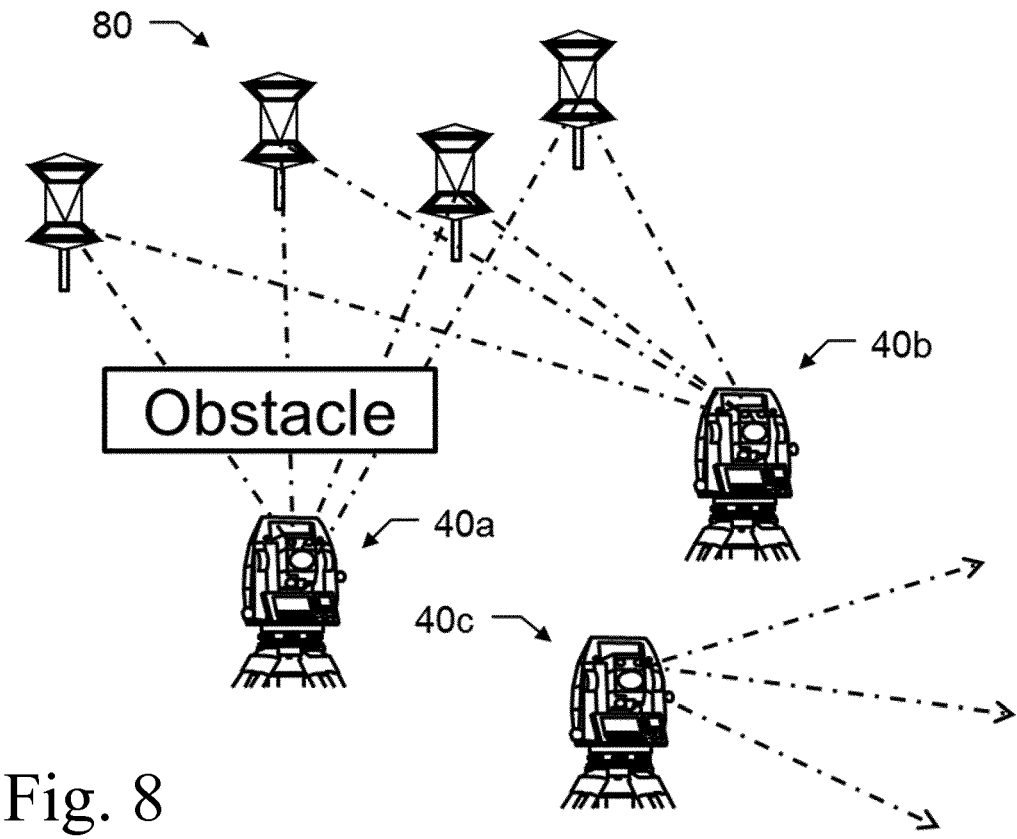
FIG. 8 illustrates an exemplary application for a workflow deployment system according to the invention with three measuring devices.

FIG. 8 illustrates an example of use of a workflow deployment system according to the invention. Three measuring devices are depicted, which in this example are embodied as total stations 40*a-c*. Software agents of a workflow deployment system (not shown here) according to the invention are assigned to each of the devices 40*a-c*.

Initially, a first total station 40*a* sequentially measures four targets 80 according to a local instruction set on the device, whereas a second total station 40*b* is idle and a third total station 40*c* performs another task.

Then an event occurs that effects the line of sight from the first total station 40*a* to one or more of the targets 80 to be blocked by an obstacle. For instance, a vehicle or other piece of equipment is moved between total station 40*a* and targets 80. Alternatively, moving obstacles constitute an obstruction that generally allows performing the measurement task but delays it unacceptably. For instance, such obstruction can be persons or cars that are constantly moving on a path or road between total station 40*a* and targets 80.

As the three total stations—by means of their software agents—are connected to the workflow deployment system, the first total station 40*a* "knows" that the third total station 40*c*—although capable to perform the task—at present is occupied with another task. Alternatively, information about availability and capability to perform the task or a part thereof can be requested when the problem is detected.

In this example the second total station 40b is available and capable to take over the task of the first total station 40a. Via the software agents, instructions can be sent from the first total station 40a to the second total station 40b so that the latter takes over the task and measures the distances to the targets 80 that are blocked for the first total station 40a.

If the second total station 40b is not capable to take over the task, the first total station 40a determines whether its task is prioritized over the task performed by the third total station 40c. In this case, the instructions will be sent to the third total station 40c so that the latter interrupts its present task and measures the distances to the targets 80 that are blocked for the first total station 40a. Further, it can be determined whether the first and/or second total stations 40a-b are capable to perform the original task of the third total station 40c. Then, instructions can be sent via the software agents from the third total station 40c to the first and/or second total stations 40a-b.

The same example applies to a setup with other measuring or surveying devices, e. g. three laser trackers or laser scanners.

If the obstructions are persons, particularly staff, these persons can be sent a notification to leave the area. If the obstructions are equipment or other objects assigned to a particular person, this person can be sent a notification to remove the object(s) from the area. The notification can be sent to a mobile device assigned to the person, e. g. a smartphone or other personal device.

The mobile device also can be a device especially designed for use with the workflow deployment system and for the purpose of receiving these notifications. It can be equipped with a position sensing device and transmit its position to the system.

The notification may further comprise information about extent of the measurement area that is to be kept clear and information about an expected duration of the measurement.

Every job (i.e. a set of measurement tasks) is created and deployed from the cloud to a device in the field. This job is created based on the task itself and the available device capabilities, and based on environment conditions (comprising e. g. temperature, vibration or lighting conditions). Once the job is deployed, the connected devices are aware of each other and can—for instance in case of a blocking situation as shown in FIG. 8—transfer the job to other devices depending on their availability and capability. The transfer can be performed either via the cloud or directly from machine to machine, i.e. without cloud interaction.

Before machines send jobs to other machines, they request the devices' capabilities. If necessary, the job can be adapted to the target machine.

A job can also be transferred partially, e. g. if only one line of sight is blocked, but the other targets 80 still can be measured by the first device 40a. A second device 40b then would measure only the blocked targets and send the result back to the first device 40a—taking into account its different position in relation to the object.

A problem of an apparatus can be defined as a state, in which the apparatus is not further able to continue its operation as planned. The problem can be an actual state or a state that will occur in the near future. Based on the example of FIG. 8, in FIGS. 9a-d several examples for predictable problems in a measuring task are illustrated. Being able to predict a problem before it actually occurs has the advantage that an adapted workflow may be calculated right away so that the original workflow may be replaced without delay when the problem occurs.

Figure 9A:
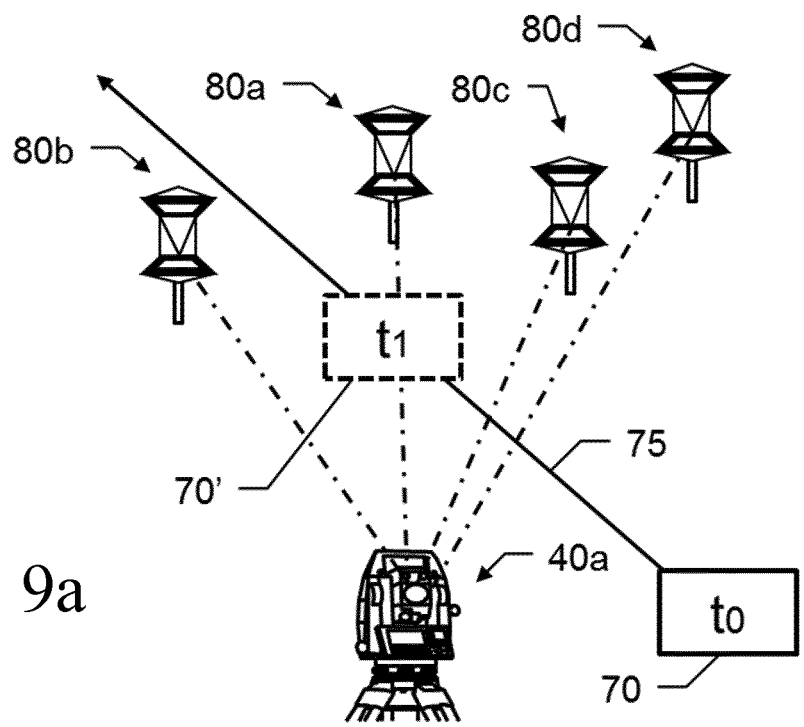
FIGS. 9a-d illustrate examples for predictable problems in a measuring task.

In the example of FIG. 9a, the measuring apparatus 40a (e.g. a total station) performs a measuring task with the targets 80a-d. Having a built-in overview camera, the apparatus detects that an object 70 is moving with a given speed towards the line-of-sight area. The apparatus 40a (or its software agent) is therefore able to predict an interference in the near future by interpolating the speed and direction 75. For instance, the apparatus can determine that at the point of time $t_1$ the line of sight to target 80a will be blocked by the object at its predicted position 70'. This problem may be reported to the system to determine whether and how the workflow needs to be adapted to avoid or minimize negative effects on the overall performance.

Since the object breaks the line of sight between apparatus 40a with targets 80c and 80d at certain points of time between $t_0$ and $t_1$, this information can be used for determining the point of time $t_1$ at which the line of sight to target 80a will be blocked.

Figure 9B:
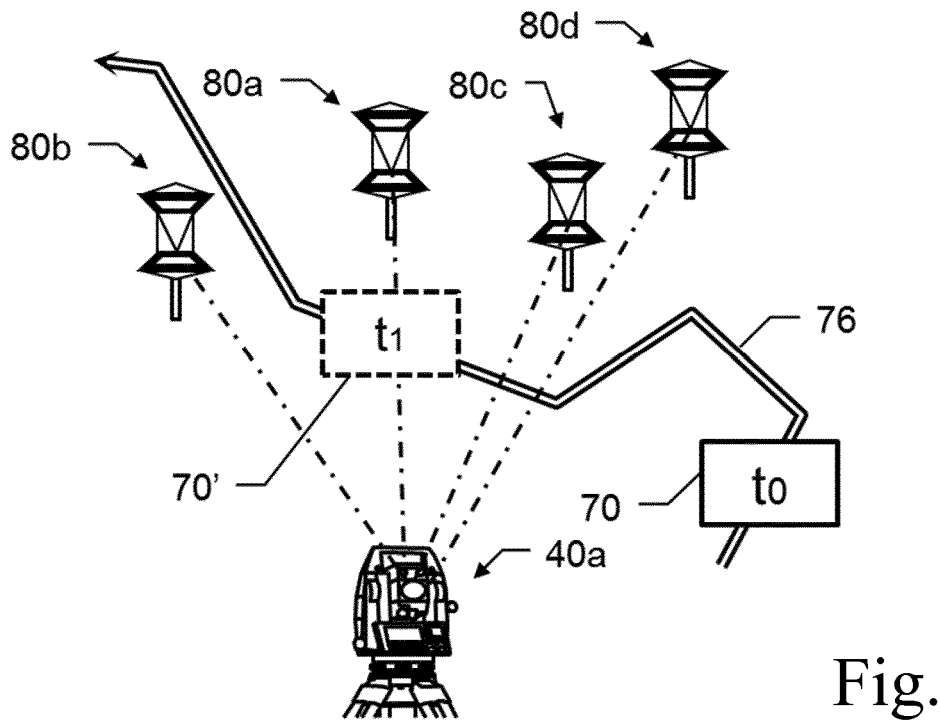

In the example of FIG. 9b, the apparatus 40a (or its software agent) has learned a path 76, e.g. from a plurality of previously passing objects 70 travelling along the path 76, as well as a typical or average speed along this path 76, the passing objects for instance being cars or machinery driving along a road corresponding to the path 76. Based thereon, the apparatus 40a (or its software agent) is able to predict the interference in the future and thus to discover the problem using supervised machine learning based on past experience.

Figure 9C:
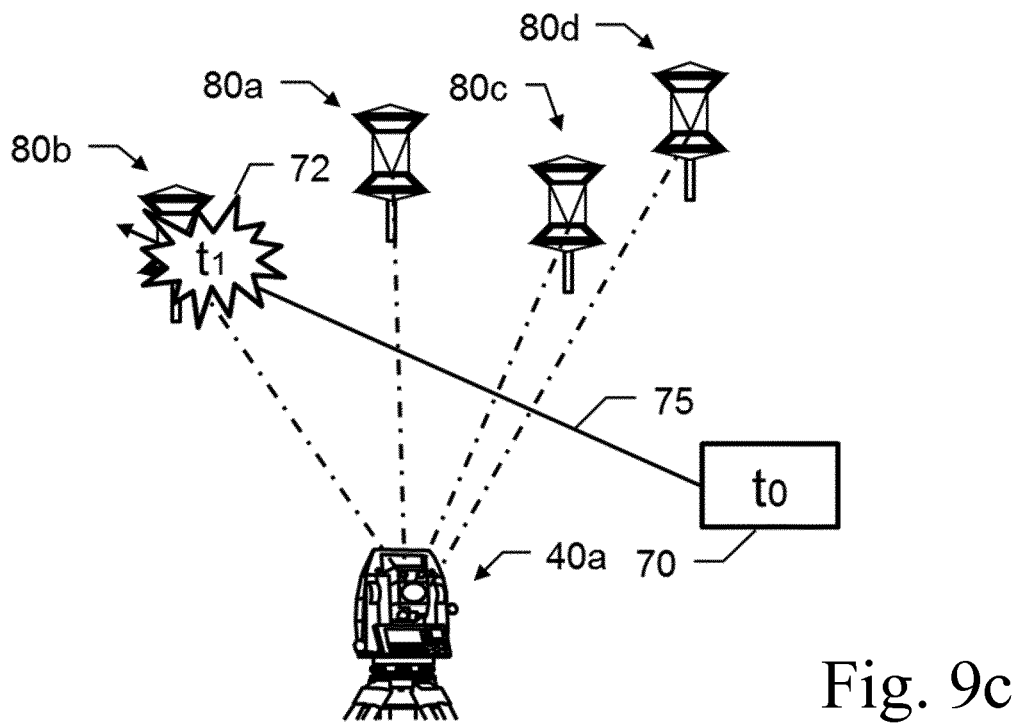

The approaches of FIGS. 9a and 9b can also be applied for predicting permanent loss of a target, e.g. because the target is going to be destroyed by an object, so that the target henceforth will not be available for proper operation. This prediction of a target loss is illustrated in FIG. 9c, where the apparatus 40a or its software agent are able to predict, from the travelling direction 75 and speed of object 70, a collision 72 with the target 80b at the point of time $t_1$, which might result in the permanent loss of said target 80b. Based on this prediction, the system will determine whether the loss at $t_1$ will constitute a problem for the workflow, i.e. if the target 80b is still needed, and how the workflow needs to be adapted. For instance, in an adapted workflow, measurements to target 80b that originally were scheduled after $t_1$ could be rescheduled to be performed earlier, i.e. before $t_1$.

Figure 9D:
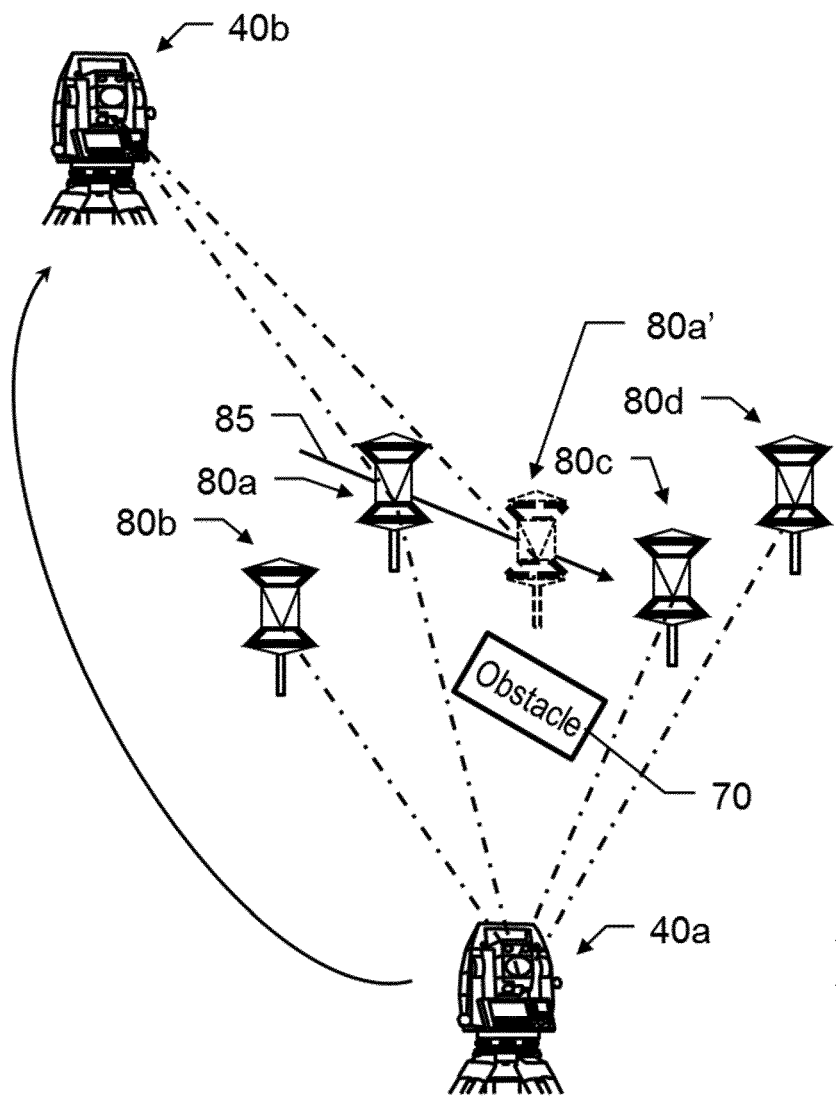

In FIG. 9d, a plurality of apparatuses 40a-b are able to monitor a position of a given target 80a, and predict its movement in the future. This allows predicting whether the monitored object 80a can be out of operational state in the near future. In the example of FIG. 9d, at the point of time $t_0$ the target 80a is accessible for both apparatuses 40a and 40b, whereas at the point of time $t_1$ the target has moved to a position where the first apparatus 40a is not able to use it anymore, so that the workflow needs to be adapted—for instance, the task of measuring the position of target 80a may be assigned to the second apparatus 40b. The task can be re-assigned before the first apparatus 40a loses its line of sight, so that advantageously no interruption of the measurement occurs.

Detecting and tracking movement of an object 70 or target 80 along a road 76 or trajectory 75 optionally can be improved by utilizing inputs from multiple apparatuses 40a-c, traffic sensors or other external cameras (not shown here).

In FIGS. 9a-d, the problems are a consequence of an external interference. External interferences for instance include external objects interfering with a task. In the case of a measuring task, as illustrated in FIGS. 9a-d, an object might block a line-of-sight between a measuring apparatus and one or more measuring targets or even destroy a part of the measurement set-up. Also, changing environmental conditions that prevent proper work of an apparatus can constitute an external interference—e.g. a temperature of the surrounding dropping below a specified operating temperature of the apparatus.

Figure 10:
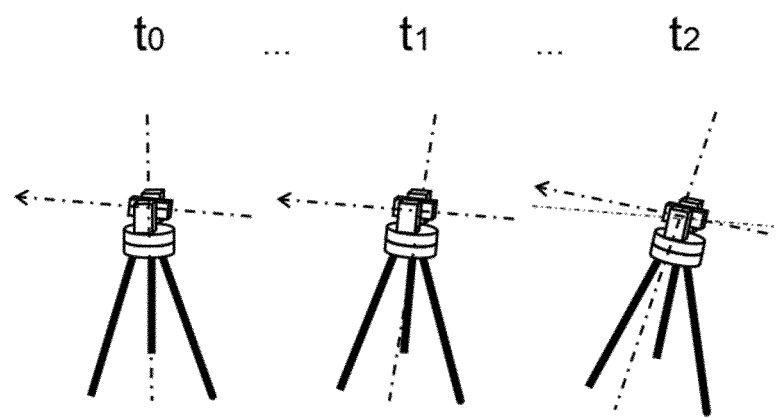
FIG. 10 illustrate another example for a predictable problem concerning the setup of an apparatus.

However, problems of a device need not be a result of external influences but also can be a consequence of internal occurrences. For instance, a device temperature, humidity or vibration could exceed a maximum operating value so that the device is forced to shut down. Another example for an internal problem is illustrated in FIG. 10, where a measuring apparatus' setup is compromised by the apparatus' tripod. The measuring apparatus, which may be a total station, a laser scanner or a similar measuring device, is provided on a tripod standing on the ground. At the point of time $t_0$, the tripod stands up straight. However, the ground (or the tripod itself) turns out to be unstable, so that the tripod with one of its legs slowly sinks into the ground. At the point of time $t_1$, the apparatus is inclined to a certain degree but still able to compensate the inclination.

At the point of time $t_2$, the apparatus cannot be operated any longer, e.g. because an inclination sensor of the apparatus has left its operating range or because the line of sight to a target gets lost. This problem can be reported when it occurs, so that the workflow can be adapted by shifting the workload of the incapacitated apparatus to another apparatus.

However, from the increasing inclination, the speed and development of the increase, the apparatus (or a software agent of the apparatus) may deduce, e.g. already at point $t_1$, when, i.e. at which point $t_2$, the apparatus cannot be operated any longer. Such a prediction can be based on a linear interpolation or on supervised machine learning techniques. The training of the machine learning may be performed based on operation, system state of the apparatus and the location of the apparatus (e.g. by country, region or continent, and/or by means of latitude, longitude and altitude values).

Here, the general assumption may be the linear interpolation of a given movement over time, predicting the time of the problem. In the example illustrated in FIG. 10, the predicted problem is the inclination sensor passing a maximum inclination angle, the principle is however the same for other internal problems of an apparatus, such as a constantly raising temperature at some point of time exceeding a maximum operating temperature.

Prediction of the time at which a problem occurs can also be improved by correlating sensor values across different measurement systems. For instance, if the temperature is close to operating temperature threshold, the CPU load goes up. If more computing is required or the motors of the apparatus are used more heavily, an increase of the apparatus' temperature is significantly higher than in normal operation. These relevant input factors for effects that let an apparatus violate its operating specifications can be learned over time on a multitude of apparatuses and based on differences between the apparatuses' functions (e.g. standard measurement mode vs. scanning with fast movement and high processing in real time).

Figure 11:
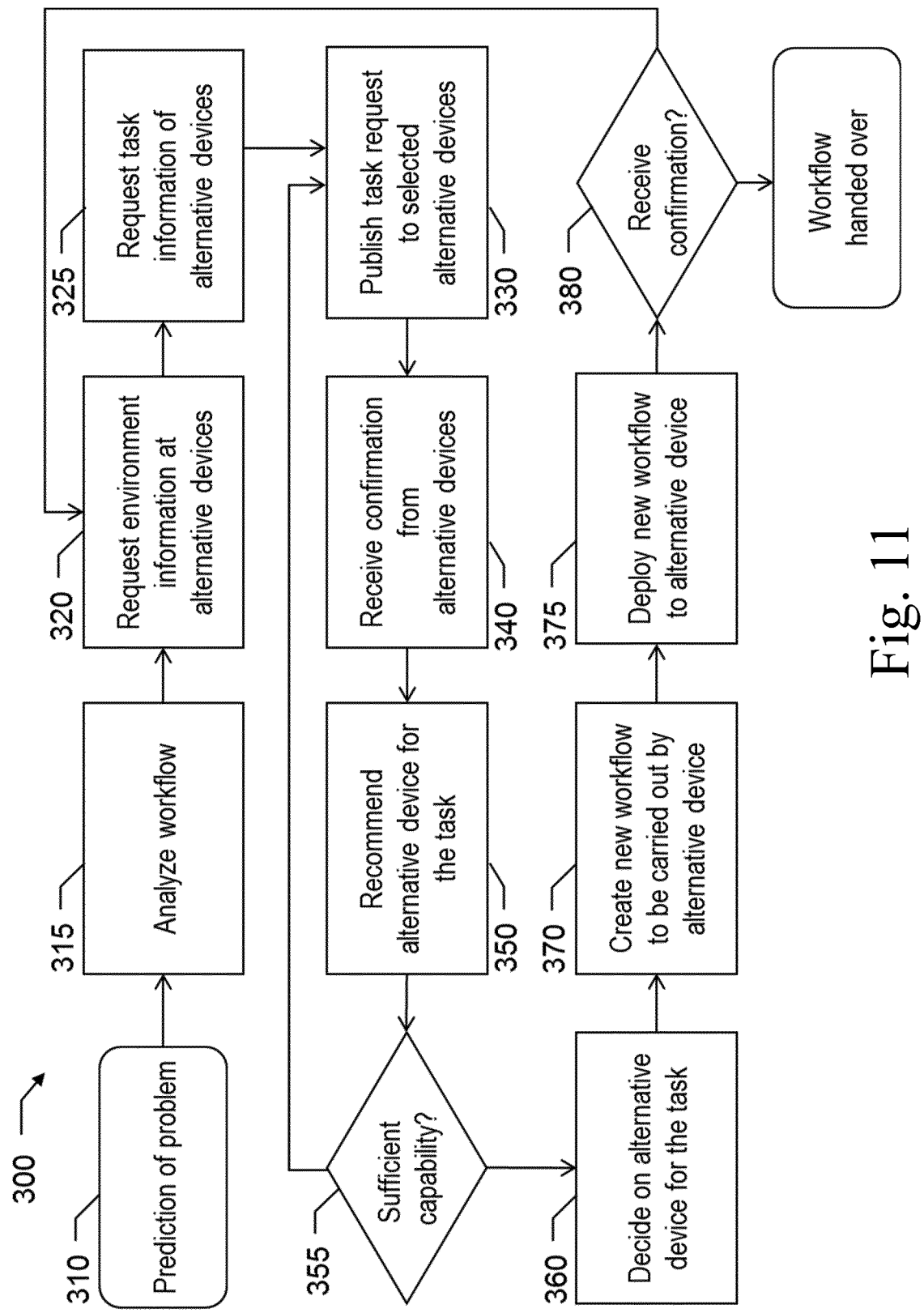
FIG. 11 shows a flowchart illustrating an exemplary embodiment of a process of deploying a modified workflow.

FIG. 11 shows a flowchart illustrating a process 300 of deploying a modified workflow when a problem compromising the present workflow is predicted.

The process 300 starts with the prediction of a certain problem (step 310). This prediction 310 may include determining the specific cause of the problem and the estimated effect on the workflow. Also, the estimated point in time when the problem is to be expected is included. If the problem is predicted to be only temporary, also an expected duration of the problem or a point of time when the problem is expected to cease to exist can be determined.

Next, the system in step 315 analyzes the present workflow related to the device at which the problem occurs. In the example that a measurement to a target is incapacitated by an object, analyzing 315 the workflow might comprise analyzing:
  movement instructions to the target,
  measurement rate,
  accuracy requirements on positioning (X,Y,Z),
  duration of execution,
  probability or errors that might occur, and
  whether human interaction is required or not.

The system in step 320 then requests environment information at alternative apparatuses. These include geospatial availability of the apparatuses and a probability of availability to receive a dynamic workflow. The latter is based on the apparatuses' system conditions, e.g. including battery level, assigned tasks, or low confidence of the predicted problem in the timeframe.

In step 325, the system requests information on utilization and future tasks of the alternative apparatuses. This may include requesting the actual workflow and task-backlog, an estimated time of execution of these tasks (e.g. including past experience on such given tasks), and information on whether the alternative apparatus is operated by a human or purely driven by deployed workflows. In the latter case, priorities may be enforced, such an apparatus may thus be more likely to be available.

In step 330, a task request is published to all surrounding alternative apparatuses. This request includes the main properties, which are at minimum required to perform the task.

In the example that a measurement to a target is incapacitated by an object, these properties may comprise:
  minimum angular accuracy,
  minimum positioning accuracy,
  minimum distance accuracy,
  minimum measurement rate for angles, inclination, distance, and
  measurement capabilities according to used targets (e.g. laser class, camera resolution and field of view, sample rate, frame rate).

In step 340, a confirmation is received by the system. This comprises a response by the alternative apparatuses to the task request, confirming that the request has been received and also reporting an estimated level of confidence concerning the task. This may comprise
  a level of confidence for achieving the expected goal at the target,
  a level of confidence for not being disturbed by other objects or by internal failure,
  a priority of current and upcoming tasks already assigned to this apparatus, and
  a level of confidence for a timeliness of being able to execute the given the priority constraints with pending tasks and workflows.

In step 350, an alternative apparatus is recommended for taking over the task. For instance, the first apparatus, i.e. the apparatus at which the problem has been predicted to occur, recommends an alternative apparatus and publishes the result of recommendation to all alternative apparatuses. Each apparatus responds on the decision and consensual feedback is gathered at the first apparatus. If the recommended apparatus turns out to be not sufficient, because of rejection of the other apparatuses, a new task request publishing 330 is performed.

In step 355, it is verified whether the capabilities of the recommended apparatus are given as described in the published task request of step 330 and whether using the recommended apparatus provides the necessary system conditions. If yes, the method continues with step 360, if not, a new task request publishing 330 is performed. Optionally, after a number of unsuccessful task requests the system decides that the problem cannot be solved without human interaction so that the automatic process ends with a corresponding output to an operator of the system.

In step 360, a decision is made regarding the alternative apparatus to take over the task and a confirmation is provided to this apparatus. In step 370, the workflow that is to be carried out by the alternative apparatus is created, for instance on the first apparatus. In step 375, the workflow is deployed to this apparatus. An exemplary embodiment of such a deployment is described in FIG. 11.

In step 380, a confirmation of a successfully executed workflow at the alternative apparatus is requested. This request can be sent after a certain time or at a certain point of time at which execution of the workflow is expected. If the workflow was not executed, the method 300 continues with step 320, otherwise, the method 300 is completed.

Figure 12:
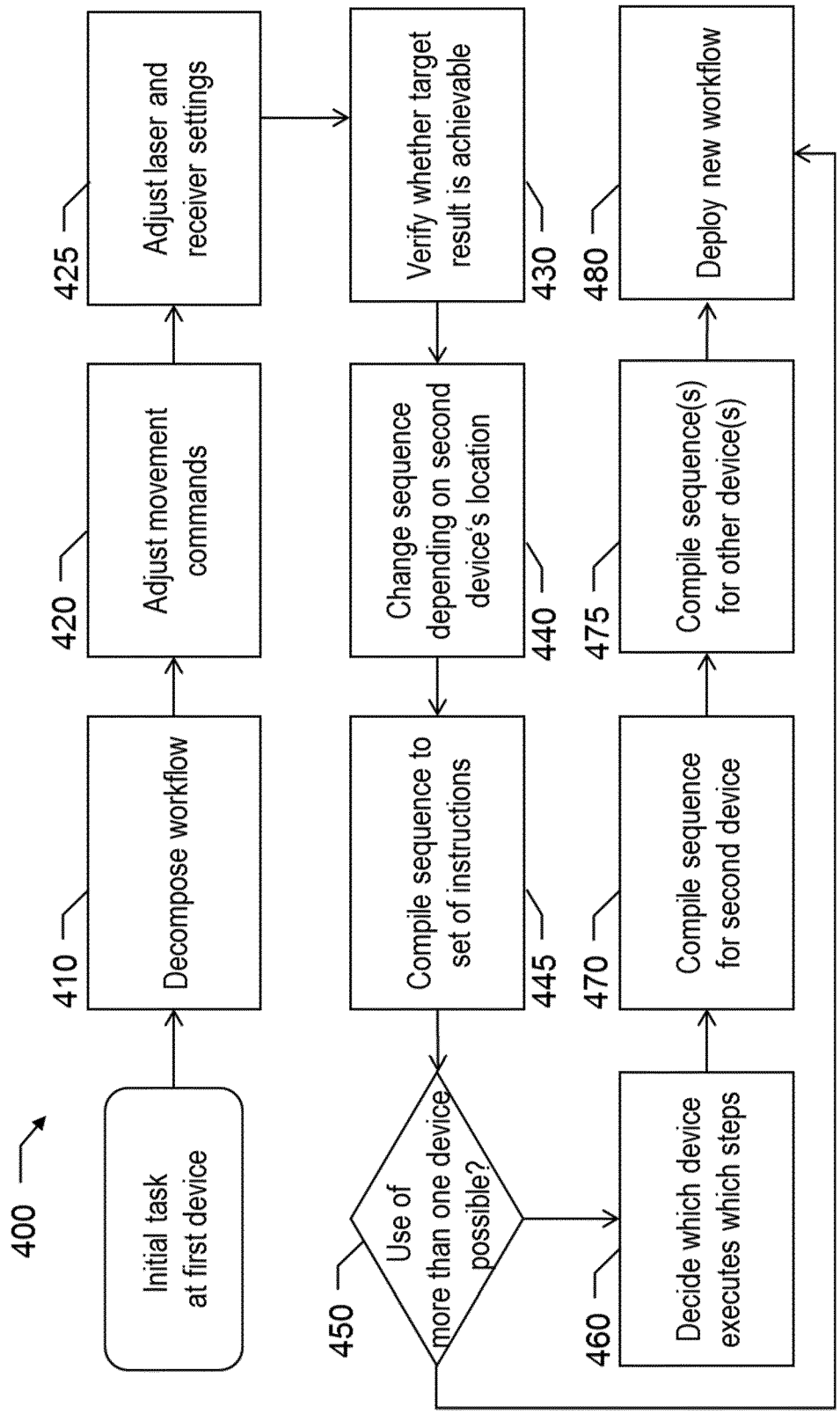
FIG. 12 shows a flowchart illustrating an exemplary embodiment of a process for a workflow deployment to one or more alternative apparatuses.

FIG. 12 shows a flowchart illustrating an exemplary embodiment of a process 400 for a workflow deployment to one or more alternative apparatuses that take over a task from an incapacitated first apparatus, for instance as a part of the method 300 of FIG. 10. The process 400 is described with the example of a measurement system as described in FIGS. 9a-d and is based on the initial measurement task at the first measurement apparatus, i.e. the apparatus at which a problem is detected or predicted. The process starts with step 410, comprising the decomposition of the workflow into sequences, logical operations, properties of operations, output data and required input data.

In step 420, movement commands are adjusted to the alternative apparatuses if necessary, e.g. if the first apparatus has a stepper motor and one or more alternative apparatuses have a piezo motor. In step 425, laser and receiver filter settings are adjusted according to a distance between an alternative apparatus and the target to achieve optimal measurement performance.

In step 430, it is determined whether the target result is achievable if the workflow sequences are changed. In step 440, the sequence is changed in accordance to the location of the alternative apparatus to reduce positioning movements and accelerate execution of the task. In step 445, the sequence is compiled into a set of instructions that is adjusted to the alternative apparatus.

In step 450, it is determined whether more than one alternative apparatus can (or must) be used to execute the sequence steps of the task. If not, the workflow is deployed to the one alternative apparatus (second device) in step 480.

Otherwise, the process continues with step 460, in which is decided, which of the alternative apparatuses performs which step, i.e. which steps are performed on the second device and which steps are performed on the one or more other alternative apparatuses. In steps 470 and 475, the sequences for the involved apparatuses, i.e. the second device and the one or more other alternative apparatuses, are compiled. In step 480, the new workflows are deployed to the involved apparatuses.

Although the invention is illustrated above, partly with reference to some preferred embodiments, it must be understood that numerous modifications and combinations of different features of the embodiments can be made. All of these modifications lie within the scope of the appended claims.

What is claimed is:

1. A workflow deployment system comprising:
at least one computing device having a memory unit and a first communication unit; and
a plurality of software agents that are adapted to be used with a plurality of electronic apparatuses, wherein each software agent is installable on an electronic apparatus of the plurality of electronic apparatuses or installed on a communication module that is adapted to be connected to one of the electronic apparatuses and to exchange data with the apparatus connected to, wherein each software agent is adapted to exchange data with the electronic apparatus it is installed on or connected to,
wherein the memory unit is adapted to store workflow data related to a workflow for performing a task, the workflow involving at least a first apparatus of the plurality of apparatuses and comprising at least a first workflow package for a first part of the task, the first apparatus being a first measuring device and the first part of the task comprising a laser-based measurement to a remote target,
wherein the computing device is adapted to assign the first workflow package to the first measuring device, and to provide workflow data related to the first workflow package to a first software agent of the first measuring device,
wherein the first software agent is adapted to monitor or predict the occurrence of problems that incapacitates the first measuring device to perform the laser-based measurement to the remote target, the problems comprising at least:
1) a presence of one or more persons or objects in a measurement area of the first measuring device, the presence constituting an obstruction for the laser-based measurement to the target, wherein the system comprises optical sensors for monitoring a movement of one or more persons or objects in a surrounding of the measurement area, and the first software agent is adapted to predict the obstruction based on the movement; and
2) an unstable setup of the first measuring device, which leads to an increasing inclination of the first measuring device, wherein the first software agent is adapted to monitor a change in the inclination of the first measuring device and to detect or predict a point of time at which the inclination passes a threshold value;
wherein, if the obstruction is detected or predicted or if the inclination passing the threshold value is detected or predicted, the workflow deployment system is adapted to perform a workflow modification process comprising:
generating customized data related to a modified first workflow package,
providing the customized data to a second software agent of a second apparatus of the plurality of apparatuses, the second apparatus being a second measuring device, and
effecting, by the second software agent and based on the customized data, the second measuring device to perform at least partially the laser-based measurement to the remote target.

2. The system according to claim 1, wherein the first and second measuring devices are geodetic surveying devices, industrial measuring devices, motorized imaging devices or reality capture devices.

3. The system according to claim 1, wherein monitoring the movement of a person or an object comprises monitoring and learning at least one typical movement path of previously passing objects or persons.

4. The system according to claim 1, wherein each object is assigned to at least one person, wherein the workflow modification process comprises:
identifying the one or more persons that are present in the measurement area and/or are assigned to at least one object that is present in the measurement area, and
sending a notification to an electronic device assigned to each of the identified persons.

5. The system according to claim 1, wherein the obstruction comprises a blocking of a line of sight between the first measuring device and the first target, and in the context of the workflow modification process the first part of the measurement task is re-assigned at least partially to the second measuring device.

6. The system according to claim 1, wherein predicting the obstruction comprises predicting at least a point of time at which the obstruction begins.

7. The system according to claim 6, wherein monitoring the movement of an object comprises monitoring a trajectory and speed of the object, wherein predicting the point of time at which the obstruction begins comprises interpolating a speed and direction of the object.

8. The system according to claim 1, wherein the workflow modification process comprises:
providing the customized data to the first software agent and the second software agent; and
effecting, by the first software agent and the second software agent and based on the customized data, the first measuring device and the second measuring device to jointly perform at least the first part of the task in a modified way.

9. The system according to claim 8, wherein the customized data comprises reconfiguration data that is adapted to reconfigure the first measuring device to adapt a measuring precision or a measuring program speed of the first measuring device.

10. A method for deploying a workflow comprising:
providing a workflow deployment system, wherein the workflow deployment system comprises a computing device having a memory unit and a first communication unit;
providing a software agent to each one of a plurality of electronic apparatuses, the electronic apparatuses comprising at least a first measuring device and a second measuring device, wherein each software agent is adapted to exchange data with the electronic apparatus and wherein providing the software agent comprises installing a software agent on the apparatus or connecting a communication module to the apparatus, wherein a software agent is installed on the communication module;
providing, at the workflow deployment system, workflow data related to a workflow for performing a task, the workflow involving at least the first measuring device and comprising at least a first workflow package for a first part of the task, the first part of the task comprising a measuring task;
assigning, by the workflow deployment system, the first workflow package to the first measuring device;
providing workflow data related to the first workflow package to the software agent of the first measuring device;
monitoring or predicting, by the software agent of the first measuring device, an occurrence of a problem related to performing the first part of the task,
performing, if the occurrence of one or more problems has been monitored or predicted, a workflow modification process for performing at least the first part of the task in a modified way, the workflow modification process comprising generating customized data related to a modified first workflow package and providing the customized data at least to the software agent of the second measuring device; and
performing, involving at least the second measuring device, at least the first part of the task in a modified way according to the customized data,
wherein the problems comprise at least:
1) a presence of one or more persons or objects in a measurement area of the first apparatus, wherein the presence of the one or more persons or objects constitutes an obstruction for the measuring task, wherein the system comprises optical sensors for monitoring a movement of one or more persons or objects in a surrounding of the measurement area, and the first software agent is adapted to predict the obstruction for the measuring task based on the movement, wherein the workflow modification process is performed when the obstruction for the measuring task due to the presence of the one or more persons or objects in the measurement area is predicted; and
2) an unstable setup of the first measuring device that effects an increasing inclination of the first measuring device, wherein the first software agent monitors a change in the inclination of the first measuring device and detects or predicts, based on the change, at least a point of time at which the inclination passes a threshold value, wherein the workflow modification process is performed when the inclination has passed the threshold value or is predicted to pass the threshold value.

11. The method according to claim 10, wherein the workflow modification process comprises providing the customized data to the software agent of the first measuring device, wherein the method comprises performing, jointly by at least the first measuring device and the second measuring device, at least the first part of the task in a modified way according to the customized data.

12. A computer program product comprising program code which is stored on a non-transitory tangible machine-readable medium comprising a program code segment, and having computer-executable instructions for:
providing workflow data related to a workflow for performing a task, the workflow a plurality of apparatuses and comprising at least a first workflow package for a first part of the task, the plurality of apparatuses comprising at least a first measuring device and a second measuring device, and the first part of the task comprising a measuring task;
assigning the first workflow package to the first measuring device;
providing workflow data related to the first workflow package to the software agent of the first measuring device;

monitoring or predicting, by the software agent of the first measuring device, the occurrence of problems related to performing the first part of the task, performing, if the occurrence of one or more problems has been monitored or predicted, a workflow modification process for performing at least the first part of the task in a modified way, the workflow modification process comprising generating customized data related to a modified first workflow package and providing the customized data at least to the software agent of the second measuring device; and performing, involving at least the second measuring device, at least the first part of the task in a modified way according to the customized data, wherein the problems comprise:
1) a presence of one or more persons or objects in a measurement area of the first apparatus, wherein the presence of the one or more persons or objects constitutes an obstruction for the measuring task, wherein the system comprises optical sensors for monitoring a movement of one or more persons or objects in a surrounding of the measurement area, and the first software agent is adapted to predict the obstruction for the measuring task based on the movement, wherein the workflow modification process is performed when the obstruction for the measuring task due to the presence of the one or more persons or objects in the measurement area is predicted; and 1) an unstable setup of the first measuring device that effects an increasing inclination of the first measuring device, wherein the first software agent monitors a change in the inclination of the first measuring device and detects or predicts, based on the change, at least a point of time at which the inclination passes a threshold value, wherein the workflow modification process is performed when the inclination has passed the threshold value or is predicted to pass the threshold value.

13. The computer program product according to claim 12, wherein the workflow modification process comprises providing the customized data to the software agent of the first measuring device, wherein the computer program product has computer-executable instructions for performing, jointly by at least the first measuring device and the second measuring device, at least the first part of the task in a modified way according to the customized data.

* * * * *